United States Patent
Park et al.

(10) Patent No.: US 9,703,355 B2
(45) Date of Patent: Jul. 11, 2017

(54) METHOD, DEVICES AND SYSTEMS FOR DYNAMIC MULTIMEDIA DATA FLOW CONTROL FOR THERMAL POWER BUDGETING

(71) Applicant: QUALCOMM Incorporated, San Diego, CA (US)

(72) Inventors: Hee-Jun Park, San Diego, CA (US); Dam Backer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 14/034,725

(22) Filed: Sep. 24, 2013

(65) Prior Publication Data

US 2015/0067377 A1 Mar. 5, 2015

Related U.S. Application Data

(60) Provisional application No. 61/870,856, filed on Aug. 28, 2013.

(51) Int. Cl.
  *G06F 13/36* (2006.01)
  *G06F 15/173* (2006.01)
  *G06F 1/32* (2006.01)

(52) U.S. Cl.
  CPC .......... *G06F 1/3212* (2013.01); *G06F 1/3206* (2013.01); *G06F 1/3234* (2013.01)

(58) Field of Classification Search
  CPC ........ G06F 9/4443; G06F 3/14; G06F 1/3265; G06F 2209/501; G06F 2209/5021

(Continued)

(56) References Cited

U.S. PATENT DOCUMENTS

| 5,859,641 A | 1/1999 | Cave |
| 6,948,082 B2 | 9/2005 | Gschwind et al. |

(Continued)

FOREIGN PATENT DOCUMENTS

WO  2013100937 A1  7/2013

OTHER PUBLICATIONS

Gibbon J.F., et al., "The Use of Network Delay Estimation for Multimedia Data Retrieval", IEEE Journal on Selected Areas in Communications, IEEE Service Center, Piscataway, US, vol. 14, No. 7, Sep. 1, 1996 (Sep. 1, 1996), XP011054528, ISSN: 0733-8716.

(Continued)

*Primary Examiner* — Faisal M Zaman
(74) *Attorney, Agent, or Firm* — The Marbury Law Group, PLLC

(57) ABSTRACT

Methods and devices for managing data flows for concurrent multimedia applications executing on a device including a SoC, in response to determining that a temperature or power consumption exceeds a threshold are disclosed. A lowest priority data flow may be identified. A data flow path associated with the identified lowest priority data flow may be traced. A multimedia parameter of any hardware module along the data flow path may be reduced. When the temperature or power consumption no longer exceeds the threshold, a highest priority data flow among the multimedia applications that has had the multimedia parameter reduced may be identified. A data flow path for a data flow associated with the identified highest priority data flow may be traced. The multimedia parameter may be restored to an original value along the traced data flow path for the data flow associated with the identified highest priority data flow.

32 Claims, 15 Drawing Sheets

(58) Field of Classification Search
USPC .... 710/19, 20, 305, 306; 713/300, 320, 324, 713/340; 709/224
See application file for complete search history.

(56) References Cited

U.S. PATENT DOCUMENTS

| | | |
|---|---|---|
| 7,962,182 B2 | 6/2011 | Kwan et al. |
| 8,001,407 B2 | 8/2011 | Malone et al. |
| 8,135,443 B2 | 3/2012 | Aleksic et al. |
| 8,843,774 B2* | 9/2014 | Chen et al. ............. 713/320 |
| 2007/0146344 A1* | 6/2007 | Martin et al. ............ 345/173 |
| 2007/0162922 A1 | 7/2007 | Park |
| 2007/0192641 A1 | 8/2007 | Nagendra et al. |
| 2008/0104430 A1* | 5/2008 | Malone et al. .......... 713/300 |
| 2010/0079508 A1* | 4/2010 | Hodge et al. ........... 345/697 |
| 2010/0145643 A1* | 6/2010 | Katpelly et al. ........... 702/63 |
| 2012/0015695 A1* | 1/2012 | Hackborn et al. ........ 455/566 |
| 2012/0210150 A1* | 8/2012 | de Lind van Wijngaarden et al. ..................... 713/320 |
| 2012/0210325 A1* | 8/2012 | de Lind van Wijngaarden et al. ..................... 718/103 |
| 2013/0046967 A1* | 2/2013 | Fullerton et al. .......... 713/100 |
| 2013/0132972 A1 | 5/2013 | Sur |
| 2013/0156407 A1 | 6/2013 | Seok |
| 2014/0006809 A1* | 1/2014 | Udeshi et al. ............ 713/300 |
| 2014/0184550 A1* | 7/2014 | Hennessey et al. ........ 345/173 |
| 2014/0237279 A1* | 8/2014 | Muralidhar et al. ....... 713/323 |
| 2014/0365790 A1* | 12/2014 | Chen et al. .............. 713/300 |

OTHER PUBLICATIONS

International Search Report and Written Opinion—PCT/US2014/052193—ISA/EPO—Oct. 27, 2014.

\* cited by examiner

METHOD, DEVICES AND SYSTEMS FOR DYNAMIC MULTIMEDIA DATA FLOW CONTROL FOR THERMAL POWER BUDGETING

CROSS-REFERENCE TO RELATED APPLICATIONS

The present application claims the benefit of priority to U.S. Provisional Patent Application No. 61/870,856 entitled "Methods, Devices And Systems For Dynamic Multimedia Data Flow Control For Thermal Power Budgeting," filed on Aug. 28, 2013, the entire contents of which are incorporated herein by reference.

BACKGROUND

As modern smart phone systems on chips (SoCs) become more integrated and powerful, with the ability to execute concurrent multimedia applications or sessions, and as requirements for extended battery life and smaller form factor become more stringent, solutions to power and battery management issues are becoming more challenging. An example of concurrent multimedia applications include a game application and a videoconferencing application both executing on the same device and providing multimedia output, for example, in different windows on the display of the device. The multimedia output may be generated by subsystems within the device, such as camera modules and graphics systems. Multiple devices may be involved in at least some of the concurrent multimedia applications. The multimedia output may thus include multimedia information received from other devices, such as over a network connection.

For various reasons, mobile computing devices running multiple concurrent multimedia applications may experience excessive power consumption. A significant portion of such power consumption may be attributable to providing high resolution multimedia video, images and graphics and other concurrent multimedia data flows. When running concurrent multimedia applications and processes, mobile computing devices, and their systems on chip (SoCs) may not meet their thermal limits. For this reason, performance levels may not be sustainable at the multimedia parameter settings such as resolution, frame rate, Level of Detail (LoD) or other parameter settings ordinarily specified for the applications as environmental conditions exceed power budget and/or thermal limits.

Current approaches to remaining within limits use hardware-level frequency throttling of a limited number of hardware subsystems when power consumption and/or temperature thresholds or limits are reached or exceeded. In current systems, the operating frequency, and thus processing power, of the entire device is limited regardless of the cause of the power consumption, thermal issues, or the types of applications in use. When frequencies are throttled or limited for only some of the subsystems in a mobile computing device, critical performance aspects of applications may suffer and the user experience may be compromised. There is currently no operating system (OS)-level centralized framework for controlling multimedia parameters associated with other processor intensive aspects of applications, such as the image resolution, frame rate, LoD or other parameters for concurrent multimedia data flows.

Current solutions to managing the power consumption and thermal budgeting issues, involve throttling frequency on main hardware system sub-blocks of the SoC, such as the central processing unit (CPU), and graphics processing unit (GPU). When measured temperature and power consumption levels exceed limits, frequency throttling of these sub-blocks takes place at the hardware level. Indiscriminate throttling of frequency across main processing sub-blocks may lower the frame rate of concurrent multimedia data flows without consideration of the respective software level or user level contribution of each of the applications or multimedia data flows to the user experience or the thermal/power consumption problem. Further, throttling main sub-blocks may cause inefficiencies based on other hardware modules continuing to generate multimedia data flows at the original resolution/frame rate/LoD. Specifically, non-throttled sub-blocks that precede or follow the frequency throttled hardware system sub-blocks along multimedia data flow paths may unnecessarily process multimedia data flows at full frequency leading to unnecessary power consumption and inefficient power reduction or control.

In current systems, each application decides the multimedia parameters, such as resolution, frame rate and LoD. There is no centralized, OS-level process for deciding multimedia parameters based, for example, on power budget and priority of each data flow.

SUMMARY

Various aspects provide methods and devices directed to managing power or temperature of a device including a system-on-chip (SoC) by managing data flows for concurrent multimedia applications. An aspect method may include identifying a lowest priority data flow among the concurrent multimedia applications in response to determining that one or more of a temperature exceeds a temperature threshold and a power consumption exceeds a power threshold, tracing a data flow path for a data flow associated with the identified lowest priority data flow, and reducing a multimedia parameter of hardware modules along the traced data flow path for the data flow. An aspect method may further include identifying a highest priority data flow among the concurrent multimedia applications that has had the multimedia parameter reduced when the one or more of temperature and power consumption no longer exceeds the threshold and tracing a data flow path for a data flow associated with the identified highest priority data flow, and restoring the multimedia parameter to an original value along the traced data flow path for the data flow associated with the identified highest priority data flow.

In an aspect method, tracing a data flow path for a data flow associated with the identified lowest priority data flow may include identifying all hardware subsystems along the data flow path operating using the multimedia parameter. In aspect method, reducing a multimedia parameter of any hardware module along the traced data flow path for the data flow may include reducing the multimedia parameter for the identified hardware subsystems along the data flow path.

In an aspect method, the multimedia parameter may include one of a resolution, and a frame rate of the data flow, and reducing a multimedia parameter of any hardware module along the traced data flow path for the data flow may include analyzing image statistics of the data flow to determine a level of dynamics associated with the data flow, first reducing the resolution for the identified hardware subsystems along the data flow path when the level of dynamics is above a threshold level, and first reducing the frame rate for the identified hardware subsystems along the data flow path when the level of dynamics is below the threshold level.

An aspect method may further include establishing priorities among data flows of the concurrent multimedia applications based on predetermined application priorities. An aspect method may further include establishing priorities among data flows of the concurrent multimedia applications based on eye gaze statistics indicating a window of concurrently displayed windows associated with the concurrent multimedia applications that is being fixated on most often. An aspect method may further include establishing priorities among data flows of the concurrent multimedia applications based upon a window of concurrently displayed windows that is associated with the concurrent multimedia applications occupies a greatest area of a display.

An aspect method may further include establishing priorities among data flows of the concurrent multimedia applications based on one or more of predetermined application priorities, based on eye gaze statistics indicating a window of concurrently displayed windows associated with the concurrent multimedia application that is being fixated on most often, and based on a window of concurrently displayed windows associated with the concurrent multimedia applications that occupies a greatest area of a display. An aspect method may further include adjusting the established priorities among the data flows for the concurrent multimedia applications based upon weights associated with application priorities for one or more of the concurrent multimedia applications.

In aspect method, reducing a multimedia parameter of a data flow associated with the identified lowest priority data flow may include analyzing a characteristic of a content of the data flow, and selecting the multimedia parameter for reduction based on results of analyzing the characteristic of the content of the data flow. In an aspect method, the multimedia parameter may include one of a resolution, a frame rate, and a level of detail (LoD) associated with the data flow. In an aspect method, the concurrent multimedia applications may include at least a teleconferencing application and a game application.

Further aspects include a computing device having a processor or processors configured with processor-executable instructions to perform operations of the methods described above. Further aspects also include a computing device having means for performing functions of the methods described above. Further aspects include a non-transitory, processor-readable storage medium on which are stored processor-executable instructions configured to cause a processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1A:
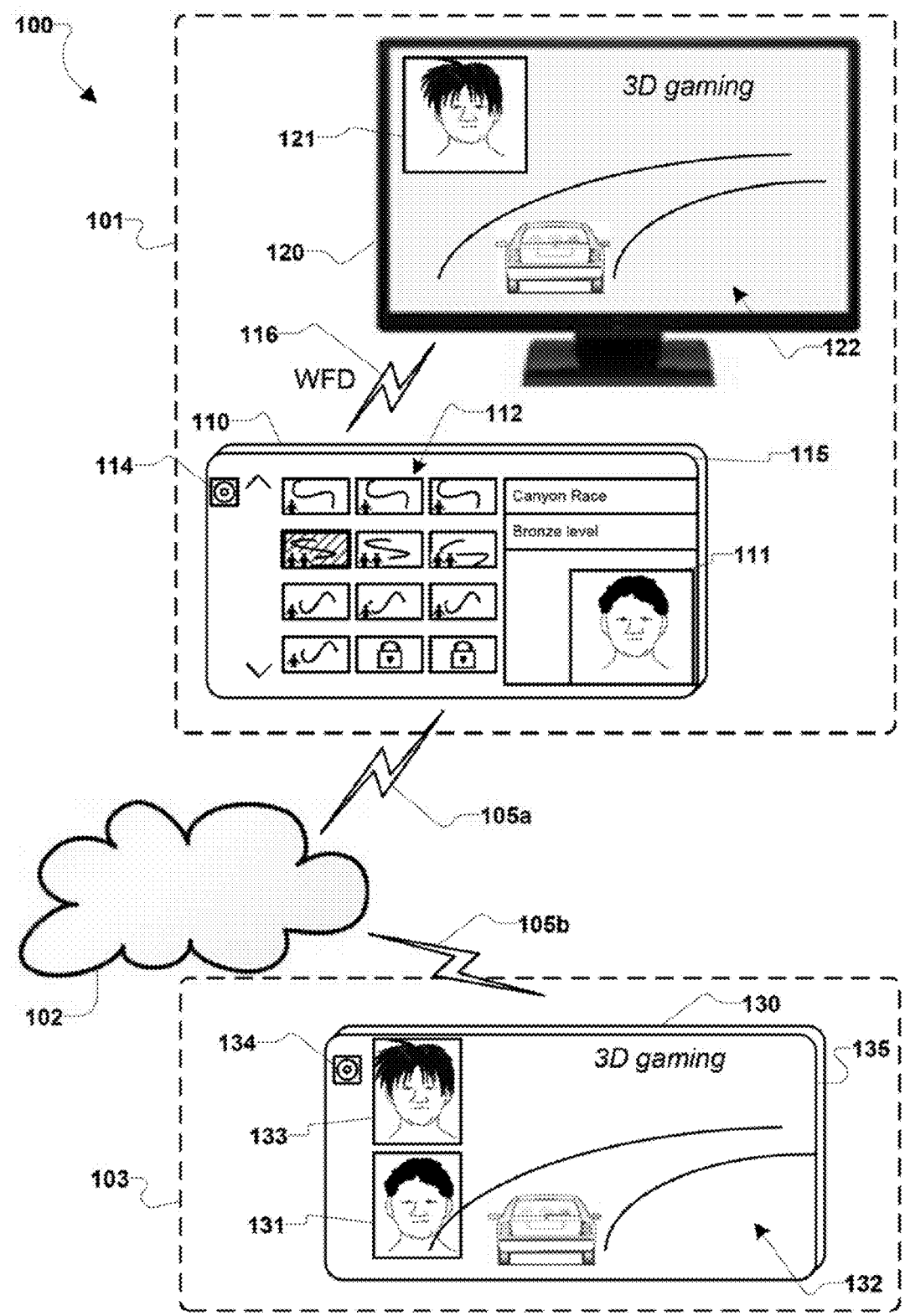
FIG. 1A is a diagram illustrating devices, a network, a shared communication channel, and concurrent multimedia applications suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used herein to refer to any one or all of cellular telephones, smartphones, personal or mobile multi-media players, personal data assistants (PDA's), laptop computers, desktop computers, tablet computers, smart books, palm-top computers, wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar personal electronic devices which include a programmable processor, especially those that include an SoC.

The term "multimedia parameter" as used herein may refer to a fixed or settable parameter such as resolution, frame rate (e.g., frames per second), level of detail (LoD), or other parameters associated with multimedia data, which can be captured, generated, displayed, processed or otherwise handled on a computing device. The multimedia data may be associated with data flows or streams, which are generally associated with sources that generate data over time, such as a video source, audio source, graphics source, or other data generation source. In various aspects, multimedia data may include image data, video data, audio data, combined audio and video or image data, and other data such as user interaction data. Multimedia data may be included in a data flow that spans multiple hardware blocks and sub-blocks and even multiple interconnected devices along a data flow path. Interconnected devices may include external devices such as external displays and may include other devices such as communication devices that are connected over a network. Multimedia data may further be generated by various hardware blocks or sub-blocks. In various aspects, multimedia data may be transmitted across a shared communication channel across a network to another multimedia device.

The terms "resolution" and "frame rate" as used herein, may refer generally to the number of pixels per frame of image data and the number of frames per given time period (e.g., per second) in a data flow. Resolution and frame rate may be expressed together in connection with a given mode. For example, a video mode of 1080p30 may refer to a resolution of 1080 horizontal lines of vertical resolution and a frame rate of 30 frames per second. At a common widescreen aspect ratio of 16:9, a video mode of 1080p would imply a vertical resolution of 1920 lines of pixels or pixel groups (e.g., RGB pixels). While certain resolutions and frame rates may be described herein as illustrative and exemplary, inventive concepts disclosed herein may be applied to any resolution and frame rate.

The term "level of detail" or "LoD" as used herein may refer to a parameter or characteristic associated with computer graphics. Level of detail or LoD may refer to the detail or complexity of a representation, such as a 3D representation of an object, when the object is rendered and displayed. In the various aspects, the LoD may be modified, including increased or decreased, under various circumstances including as the displayed object moves toward or away from the viewer. The LoD may be modified, including increased or decreased, according to other metrics such as object importance, viewpoint-relative speed or position, or other metrics. Modification of the LoD may increase the efficiency of object rendering by decreasing the workload on graphics processing pipeline stages, usually vertex transformations, for example when the LoD is decreased. The corresponding reduced visual quality of the object is often unnoticed because of the small effect on object appearance when the object is distant or fast moving. Modification of LoD may ordinarily be applied to geometry detail. However, as used herein, LoD may additionally refer to other details, such as shading, texturing, or other details, the management of which may contribute to control over pixel complexity and the quality of object rendering.

In aspects, in a device or devices that are executing concurrent multimedia applications, when the SoC temperature or the SoC power consumption levels exceed predetermined limits or thresholds, actions may be taken to reduce processing demands while maintaining or providing the best achievable user experience under the circumstances. The SoC temperature and the SoC power, as measured in sensors, or as otherwise obtained, may be provided to a multimedia parameter manager that may be configured to control or override multimedia parameters such as the processing resolution, frame rate, LoD or other parameter, in each hardware block that is present in a corresponding data flow path or paths for a data flow or flows. The control of the multimedia parameters by the multimedia parameter manager may be based on a priority established for each data flow or multimedia application. A data flow tracer may collect information of all data flow paths, such as information regarding the hardware blocks or sub-blocks that are present in each data flow path. Information about the data flow path may be obtained from various sources including packet header information of packets associated with the data flows. The data flow path information may further include information regarding a device of another user that may be sharing a communication channel and at least one of the concurrent multimedia applications, such as a multiplayer game application, teleconferencing application, or other multi-user application. Such information may include the destination address of the other user or users, the quality of service (QoS) associated with at least the portion of the data flow that extends over the network to the other user or users.

A multimedia parameter adjustment may be made by the multimedia parameter manager in one or more low priority data flows, while preserving the multimedia parameters associated with one or more high priority data flows. By adjusting multimedia parameters in the low priority data flows, degradation of a user experience on high priority data flows may be reduced, minimized or eliminated. Power consumption in all hardware blocks or sub-blocks identified by the data flow tracer that are present in the low priority data flows, including hardware blocks or sub-blocks in a device that is coupled on a shared communication channel may be effectively reduced. Logic may be provided for each block or sub-block in the data flow path to decide, for example, an adjusted multimedia parameter for the block. The adjusted multimedia parameter may be based on an original parameter, an override parameter and parameters of downstream blocks.

Priorities for each of the data flows may be established in a variety of ways. For example a high priority may be established for a data flow associated with an application window on a display that is seen most often by the user of the device. Eye gaze recognition achieved by analyzing images captured by a camera on the device may be used to automatically detect and generate statistics of eye gaze location on the screen or on an external device. Windows having the greatest correlation between gaze location statistics and window location, and the applications or data flows associated with these windows, may be established as high priority applications or data flows. Alternatively, data flows associated with active windows occupying the largest amount of screen area may be designated as high priority data flows. Further, the applications may provide additional information associated with, for example, their preferred, required or recommended, multimedia parameter requirements, such as resolution, frame rate, or LoD, which may be used in establishing at least initial priorities for the data flows. The multimedia parameter manager and data flow tracer may use any or all of the above described information, for example, eye gaze information, window area information, hint information, and other information in deciding priorities to establish for data flows.

As described above, priorities may be established for data flows for use in adjusting performance or power demands of hardware modules along data flow paths of low priority data flows. However, application layer considerations may result in priorities for applications that deviate from or conflict with the priorities established for the data flows according to aspect methods described above. Table 1 shows an example of applications and data flows with assigned priorities. In the illustrated example, data flows A-1, A-2, and A-3 are associated with concurrent multimedia application A, data flows B-1, and B-2 are associated with concurrent multimedia application B, and data flow C-1 is associated with concurrent multimedia application C. Priorities associated with the data flows may be arranged in descending order from top to bottom as shown in Table 1.

TABLE 1

| Applications | | Data flows | |
| --- | --- | --- | --- |
| Multimedia | | | |
| Application # | Priority | Data Flow # | Priority |
| A | 2 | A-1 | 1 |
| | | A-2 | 2 |
| | | A-3 | 5 |
| B | 3 | B-1 | 3 |
| | | B-2 | 4 |
| C | 1 | C | 5 |

In the example illustrated in Table 1, data flow A-1 has been assigned a priority of 1 (e.g., highest priority), data flow A-2 has been assigned a priority of 2, data flow A-3 has been assigned a priority of 3, data flow B-1 has been assigned a priority of 4, data flow B-2 has been assigned a priority of 5, and data flow C has been assigned a priority of 6 (e.g., lowest priority). However, Table 1 also shows that priorities for concurrent multimedia applications A, B, and C are established in an order that potentially deviates or conflicts with the established priorities for the data flows. In an aspect, situations in which multiple concurrent applications are prioritized (e.g., based on eye gaze, window order, user settings, etc.) and one or more of the concurrent applications has more than one data flow may be addressed by weighting the priority of the data flows based on the priorities of the applications and adjusting the data flow priorities based on the assigned weights as described in greater detail below with reference to FIG. 5D.

In aspects, a system on chip (SoC) may have multiple hardware blocks or sub-blocks including processors of varying capabilities, a camera block or blocks, a camera sub system block or blocks, a memory device block or blocks including DRAM, a power management block or blocks, a display block or blocks, a radio module block or blocks, and other blocks. Non-limiting examples of processors may include high efficiency processors, such as DSPs, modem processors, visual or graphics processing units (GPUs), dedicated high efficiency processing engines, dedicated high efficiency hardware engines. Further non-limiting examples of processors may include high performance processors, such as applications processors, high performance processors with multiple processor cores, ARM architecture processors, or other processors that would be suitable in a SoC.

FIG. 1A illustrates an example 100, of a device environment 101 that includes the first device 110, and a device environment 103 that includes a second device 130. The first device 110 and the second device 130 may be connected through a network 102. The connection may be accomplished, for example through wireless links 105a and 105b that link the devices 110 and 130 to respective access points, cellular network infrastructure components, or other wireless (or wired) access nodes. The network 102 may be a wireless local area network (WLAN) or maybe a cellular communication network through which the first device 110 and the second device 130 may communicate. The first device 110 and the second device 130 may communicate over the network 102, for example, via a shared communication channel, a packet data session, or other connection mechanism depending on the configuration and protocol associated with the network 102. In the device environment 101, the first device 110 may communicate with an external display 120 through a wireless connection 116, which may be a Wi-Fi Direct (WFD), WiDi, or similar connection. The wireless connection 116 may allow the second device 130 and the external display 120 to communicate directly and wirelessly without the need for an access point.

The first device 110 may be equipped with a camera 114 and a display 115. The first device 110 may be executing concurrent multimedia applications such as a video teleconferencing application and a game application. The video teleconferencing application may capture video of the user of the first device 110 using the camera 114, and may display the video of the user locally in window 111 on the display 115 of the first device 110. The video teleconferencing application may also send the video stream captured by the camera 114 to the second device 130 over the network 102. The game application may render a local display of, for example, a control window of the game application in window 112 on the display 115 of the first device 110. The first device 110 may also take advantage of the external display 120 and the wireless connection 116 to pass graphics data associated with the action portion of the game display to the display 120 for rendering in a window 122.

In aspects, the first device 110 may concurrently display an incoming portion of a video stream or data flow associated with the other side of the video teleconferencing application in a window 121. The incoming portion of the video stream or data flow may be based on video data received from the second device 130 over the network 102. The incoming portion of the video stream may be transferred to the first device 110 from the second device 130 over the network 102 and may be transferred along the data flow path for the video teleconferencing application. The multimedia parameters, such as resolution, frame rate, LoD, and other multimedia parameters for the game application and the video teleconferencing application, may be applied to the window 111, the window 112, the window 122 and the window 121. The multimedia parameters may be applied based on the native multimedia parameters or modified multimedia parameters of various hardware modules along the respective data flow paths associated with the data flows for capturing, generating and transferring game graphics data and video teleconferencing data. In addition, the multimedia parameters may be specified as QoS parameters associated with data packets that constitute the data flows.

Similarly, the second device 130 may include a camera 134 and the display 135. The second device 130 may be executing concurrent multimedia applications such as the video teleconferencing application and the game application. The video teleconferencing application may capture video of the user of the second device 130 using the camera 134, and may display the video of the user locally in window 133 on the display 135 of the second device 130. The video teleconferencing application may also send the video stream captured by the camera 134 to the first device 110 over the network 102. The game application may render a local display of the action portion or other portions of the game display in window 132 on the display 135 of the second device 130. The second device 130 may concurrently display a video stream associated with the other side of the video teleconferencing application in a window 131 based on video data received from first device 110 over the network 102, which is part of the data flow path for the video teleconferencing application on the second device 130 and the first device 110. The multimedia parameters, such as resolution, frame rate, LoD, and other multimedia parameters for the game application and the video teleconferencing application may be applied to the window 131, the window 133 and the window 132. The multimedia parameters may be applied based on the native multimedia parameters or modified multimedia parameters of various hardware modules along the respective data flow paths associated with the data flows for capturing, generating and transferring game graphics data and video teleconferencing data.

Figure 1B:
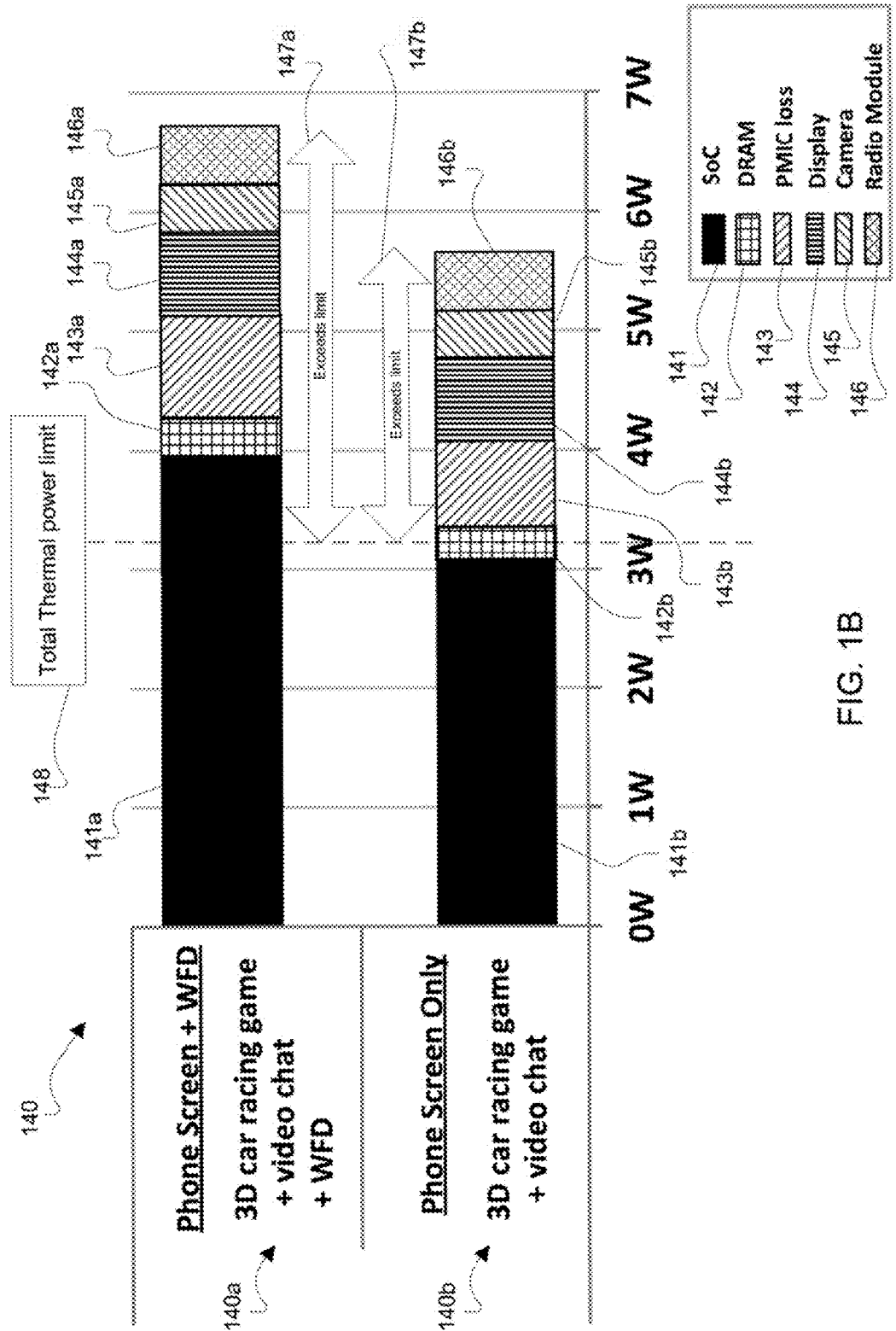
FIG. 1B is a graph illustrating hardware block power consumption for device configurations and concurrent multimedia applications.

While executing concurrent multimedia applications, devices such as the first device 110 and the second device 130, and particular SoC blocks or sub-blocks installed therein, may approach or exceed power and temperature limits. In such circumstances, continued operation at full scale multimedia parameters may become unsustainable. In FIG. 1B, a graph 140 illustrates example power levels for various blocks within an SoC, which may be installed in the first device 110 and the second device 130. A graph 140a shows relative power consumption for a device, such as first device 110, that supports a local display and an external wireless (WFD) display device. The device may be executing concurrent multimedia applications such as a game application and a video teleconferencing or video chat application. FIG. 1B illustrates how during the execution of the concurrent multimedia applications a power level 141a for an SoC 140 associated with the first device 110 may exceed an illustrative total power consumption limit 148 at an example value of around 3.2 Watts (W). Additional power consumption contributions may be added to by a DRAM 142, a power management integrated circuit (PMIC) 143, a display 144, a camera 145, and a radio module 146 associated with the first device 110. The respective blocks add a DRAM power contribution 142a, a PMIC power contribution 143a, a display power contribution 144a, a camera power contribution 145a, and a radio module power contribution 146a to the power consumption for the first device 110. The additional power contributions lead to significantly exceeding the total power consumption limit 148 by an amount 147a, which, in the example, may be nearly double the power/thermal budget.

A graph 140b shows relative power consumption for a device, such as second device 130 that supports a local display (e.g., device display) and is executing concurrent multimedia applications such as a game application and a video teleconferencing or video chat application. During the execution of the concurrent multimedia applications, a power level 141b for an SoC 140 associated with the second device 130, may exceed an example total power consumption limit 148 at around 3.2 Watts (W). Additional power consumption contributions may be added to by a DRAM 142, a power management integrated circuit (PMIC) 143, a display 144, a camera 145 and a radio module 136 associated with the second device 130. The respective blocks add a DRAM power contribution 142b, a PMIC power contribution 143b, a display power contribution 144b, a camera power contribution 145b and a radio module power contribution 146b. The additional power contributions may lead to significantly exceeding the example total power consumption limit 148 by an amount 147b. The amounts 147a and 147b, by which the first device 110 and the second device 130 exceed the power limit may be possible to tolerate for short periods of time, depending on circumstances such as ambient temperature and other factors, but cannot be sustained for extended periods of time without invoking shut down mechanisms or other extreme measure that may disadvantageously result in ending the concurrent multimedia applications and whatever game or conference sessions are in progress.

Figure 1C:
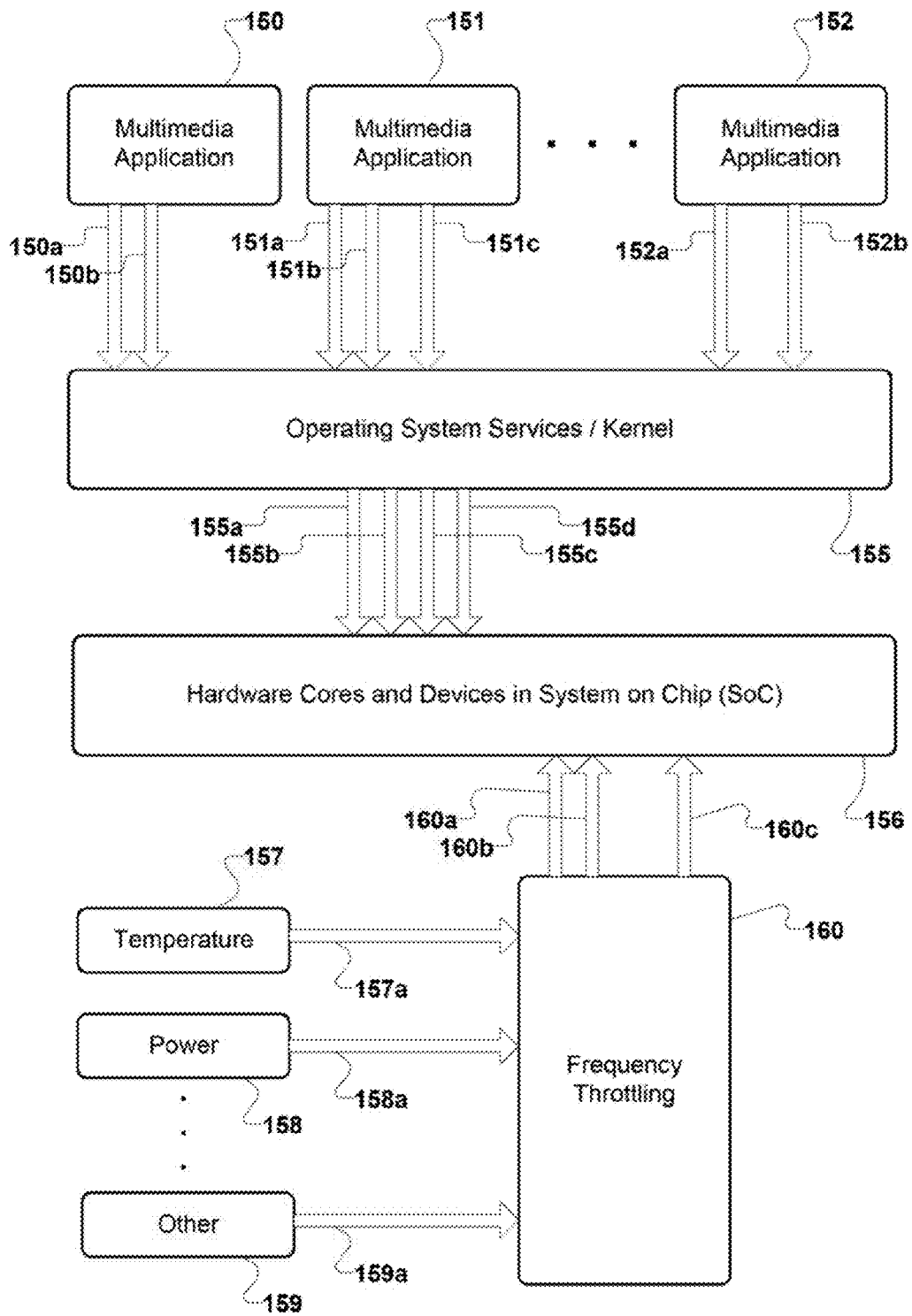
FIG. 1C is a block diagram illustrating a system configuration for managing power consumption including hardware devices and concurrent multimedia applications using frequency throttling.

In a general example, hardware and software associated with devices that execute concurrent multimedia applications may be configured as shown in FIG. 1C. One or more multimedia applications 150, 151, 152 may have various data flows having specific requirements for multimedia parameters. The multimedia application 150 may have data flows 150a and 150b, which may have multimedia parameter requirements such as resolution, frame rate, LoD, and other parameters associated therewith. The multimedia application 151 may have data flows 151a, 151b, and 151c with respective multimedia parameter requirements associated therewith. Further, the multimedia application 152 may have data flows 152a and 152b with respective multimedia parameter requirements associated therewith. The multimedia parameter requirements for the data flows 150a, 150b, 151a, 151b, 151c, 152a, and 152b may be the same within each of the applications, or among the various applications, or may be different. Typically, at least some of the multimedia parameter requirements for the data flows may be different within each of the applications, or among the various applications. Ordinarily, within an application different data flows may be may be established with different multimedia parameter requirements, based on, for example, the different hardware blocks or modules that are associated with the data flows. More specifically, different hardware blocks or modules that generate data flows may do so at different multimedia parameters, while various hardware modules that process data flows may be capable of handling data flows with different multimedia parameter. For examples, camera applications may have data flows associated with video at a particular resolution, frame rate, and LoD. A graphics rendering associated with, for example a concurrent game application may also have a particular resolution, frame rate, and LoD.

In existing solutions, the individual native multimedia parameter requirements for the data flows 150a, 150b, 151a, 151b, 151c, 152a, and 152b and the data flows themselves may be processed or handled by Operating System (OS) services and OS kernel module 155. The OS kernel may provide individual device level services and application level services for the devices and applications that are using data generated in the devices. Various multimedia parameter requirements 155a, 155b, 155c and 155d may be individually passed to the hardware cores and devices associated with the SoC 156, which may be implemented as settings and configurations of the individual hardware and devices on the SoC 156. However, in present multimedia devices, no centralized OS services or kernel modules exist for implementing coordinated system wide changes in multimedia parameters. In an example of a conventional system, a frequency throttling module 160 may be configured to receive input from various sensors such as a temperature sensor 157, which may provide a temperature input 157a, a power sensor 158, which may provide a power input 158a, or other sensor 159, which may provide an input 159a. Other sensors or inputs may be associated with and include a skin temperature of the device, an outside or ambient temperature, a temperature trend input, a battery charge level input, or other input. When the inputs reach or exceed certain established values or levels, the frequency throttling module 160 may provide throttling signals 160a, 160b, and/or 160c to a specific fixed set or subset of hardware modules in the SoC 156, without specific consideration of multimedia parameters. Generally, the main hardware modules such as a main processing unit (MPU) and a graphics processing unit (GPU) may be throttled as these modules are considered to have the most immediate and significant effect on power consumption. However, because the other non-throttled modules continue to operate at the usual frequency according to the native multimedia parameters, the efficiency of the throttling for reducing power consumption is disadvantageously limited. When the level of the inputs returns to sub-threshold levels, the frequency throttling may be terminated and the operating frequency of the throttled hardware modules may be returned to the normal frequency values.

Figure 2A:
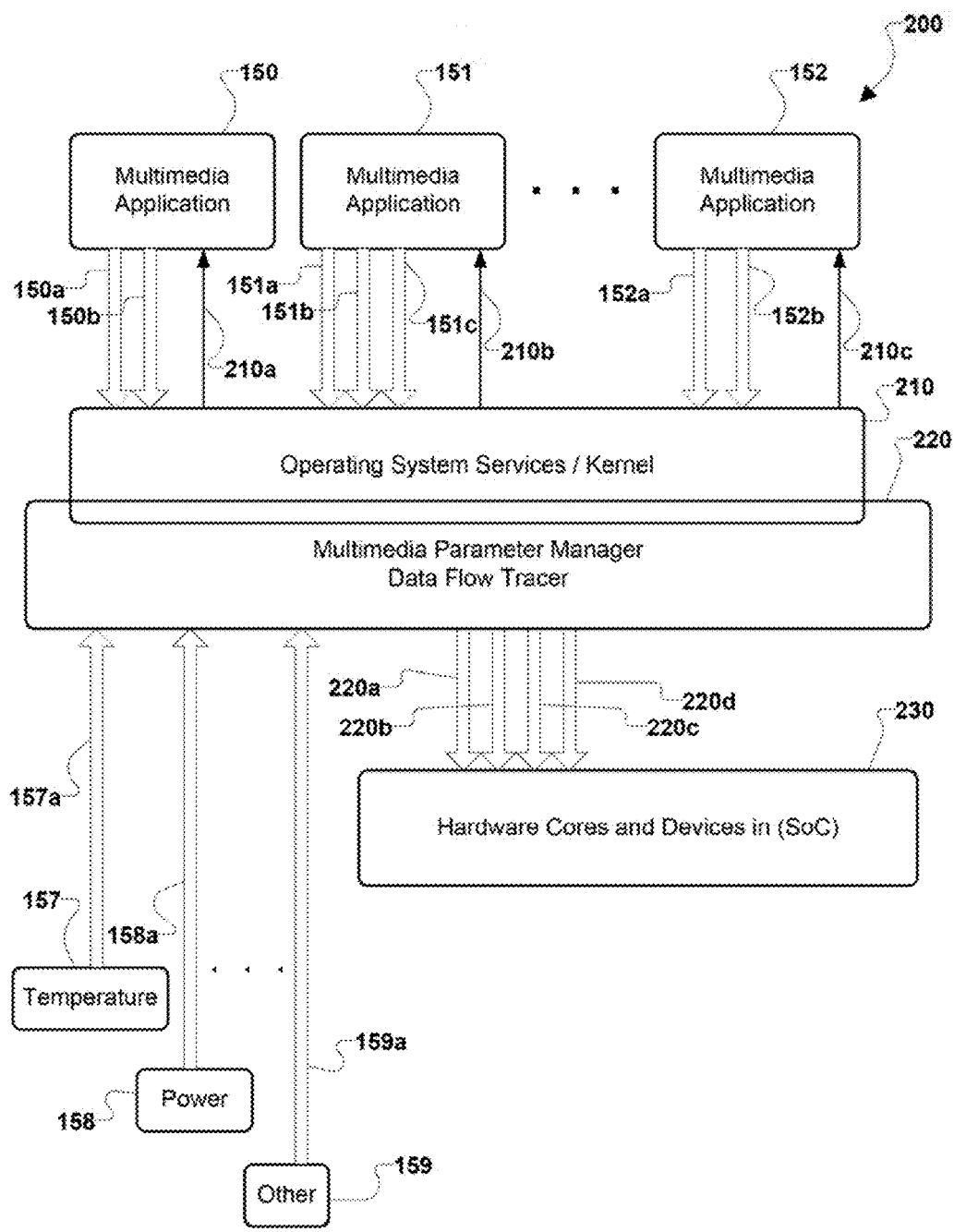
FIG. 2A is a block diagram illustrating a system configuration for managing power consumption including hardware devices and concurrent multimedia applications using a multimedia parameter manager and data flow tracer in various aspects.

To address these and other disadvantages of frequency throttling and other approaches, an example system 200 illustrated in FIG. 2A suitable for use with various aspects, which is, may include elements that provide a more comprehensive and efficient approach to reducing power consumption, for example, in an SoC. Concurrent multimedia applications 150, 151 and 152 may have various data flows with requirements for multimedia parameters. The multimedia application 150 may have data flows 150*a* and 150*b*, which may have multimedia parameter requirements such as resolution, frame rate, LoD, and other parameters associated therewith. The multimedia application 151 may have data flows 151*a*, 151*b*, and 151*c* with respective multimedia parameter requirements associated therewith. Further, the multimedia application 152 may have data flows 152*a* and 152*b* with respective multimedia parameter requirements associated therewith. The concurrent multimedia applications 150, 151, 152 may include, for example, a video teleconferencing application, a real time, multi-player game, and a video display application. The video teleconferencing application and the multi-player game application are examples of concurrent multimedia applications that may be connected to an additional party or parties over a network. Thus, multimedia data flows associated with the video teleconferencing application and the gaming application may be considered as extending over the network to the other party or parties.

The multimedia parameter requirements for the data flows 150*a*, 150*b*, 151*a*, 151*b*, 151*c*, 152*a*, and 152*b* and the data flows themselves may be processed or handled by OS services and OS kernel module 210. The OS kernel may provide device level services and application level services for the devices and applications that are using data generated in the devices. In various aspects, a multimedia parameter manager and data flow tracer 220 may be interposed as a layer between the OS services and OS kernel module 210, the concurrent multimedia applications 150, 151, and 152 and the hardware core and devices in SoC module 230. The multimedia parameter manager and data flow tracer 220 may receive input from sensors such as the temperature sensor 157, which provides the temperature input 157*a*, the power sensor 158, which may provide the power input 158*a*, or the other sensor 159, which may provide the input 159. Although described as sensors, the temperature sensor 157, the power sensor 158, or the other sensor or sensors 159 may represent registers, or other devices, in which calculated values or values obtained from a different source than an actual sensor, may be stored. Thus the inputs provided, such as the temperature input 157*a*, the power input 158*a*, or the other input or inputs 159*a* may be provided from sensors, registers, other devices, or other source of the respective values.

One or more of the temperature input 157*a*, the power input 158*a*, or the other input or inputs 159*a* input to the multimedia parameter manager and data flow tracer 220 may exceed established thresholds for power and thermal management. In response, or prior to values exceeding thresholds, the multimedia parameter manager and data flow tracer 220 may conduct operations to trace data flows, such as data flows 220*a*, 220*b*, 220*c*, and 220*d*, through the various hardware cores and devices associated with the SoC 230 to establish corresponding data flow paths. Tracing data flow paths may include examining or inspecting packet headers of packets associated with data flows to determine paths through the hardware taken by the data packets. The data flow paths may include portions of the path that extend to and from other devices to which the device may be connected, for example, through a shared communication channel over a network connection. The multimedia parameter manager and data flow tracer 220 may establish priorities associated with the data flows and/or the concurrent multimedia applications 150, 151, and 153. When the sensor input values such as temperature and power, reach or exceed the threshold levels required for thermal and power control, the multimedia parameter manager and data flow tracer 220 may reduce or override the multimedia parameters. Multimedia parameters, such as resolution, frame rate, LoD, or other parameters associated with the low priority data flows and/or applications that contribute the least to preserving or maximizing the user experience, may be overridden or reduced in order to reduce power consumption in the hardware modules along the low priority data flow paths. When the sensor input values return to values below the threshold values, the multimedia parameter manager and data flow tracer 220 may determine whether multimedia parameters associated with low priority data flows, or any data flows, have been reduced or overridden. The multimedia parameter manager and data flow tracer 220 may restore multimedia parameters associated with the highest priority data flows in which the multimedia parameter have been reduced, to their pre-reduction values, original, or native values as will be described in greater detail below.

Figure 2B:
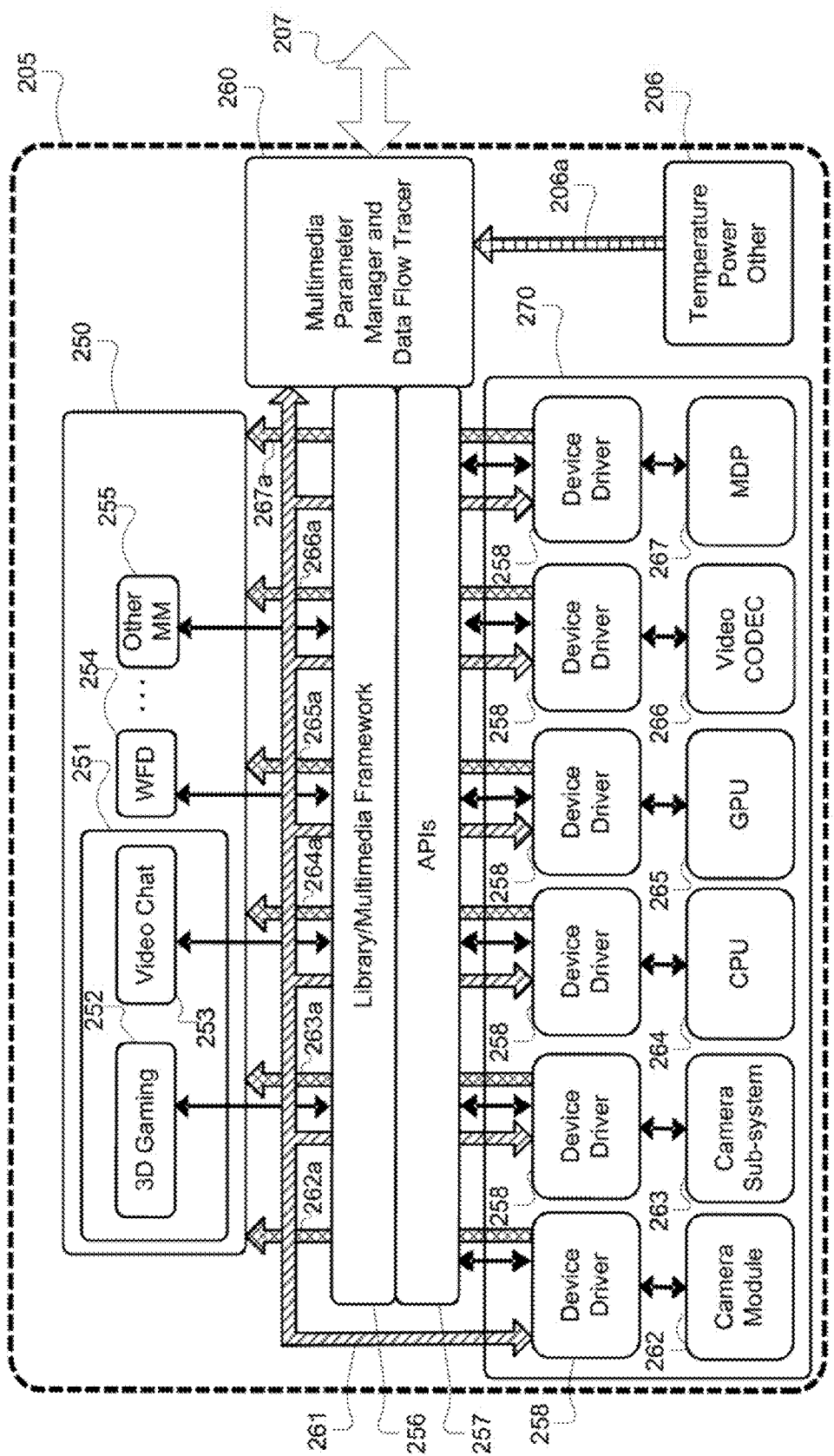
FIG. 2B is a hardware block diagram illustrating notification, data flow tracing and multimedia parameter management in various aspects.

A representative device 205 suitable for implementing aspects is illustrated in FIG. 2B. The device 205 may include a concurrent application block 250, which may represent an environment of multiple concurrently executing multimedia applications of different types and with multimedia parameter requirements. The concurrent application block 250, may contain concurrent multimedia applications 251 that involve shared communication channels that couple the device 205 to another device or devices over a network connection. Concurrent multimedia applications 251 may include, for example, a 3-D gaming application 252 and a video chat application 253. The concurrent application block 250 may also include a display application to 54, which may be used to control a wireless display that is external to the device 205. The application block 250 may also include other multimedia applications 255. The device 205 may also include a multimedia parameter manager and data flow tracer 260, which may be configured to manage multimedia parameters such as resolution, frame rate, LoD, or other parameters, and trace data flow paths. The multimedia parameter manager and data flow tracer 260 may, for example, trace data flow paths associated with multimedia data flows and identify all hardware modules involved in respective data flows. The multimedia parameter manager and data flow tracer 260 may further identify data flow paths that extend to another device or devices over a network connection, such as network connection 207.

The device 205 may also include a hardware block 270, which may include hardware sub-blocks or sub-systems, which, for example, may be modules of an SoC. The hardware block 270 may include a camera module 262, a camera sub system 263, a central processing unit (CPU) 264, a graphics processing unit (GPU) 265 a video encoder/decoder (CODEC) 266 and a mobile development platform (MDP) module 267. The hardware sub-blocks may be coupled to corresponding device drivers 258, which may be specifically configured for each hardware sub-system. Alternatively the device drivers 258 may be generic, or may be generic to the type of hardware associated with the subsystem. The device drivers 258 may be installed as part of an operating system kernel or operating system services that allow the hardware sub blocks to function together with the operating system, application software and the rest of the device components, systems and subsystems. Alternatively, the device drivers 258 may be part of a library that is linked to by the application programs during run-time. The hardware sub-systems may be capable of generating multimedia data according to a variety of multimedia parameters, such as resolution, frame rate, level of Detail (LoD), and other parameters, which may be controlled by software modules that use the hardware sub-systems through interaction with the respective device driver 258. The device drivers 258 may provide an interface between the devices themselves and software that may require access to the hardware subsystem, or that may send data to or receive data from the hardware sub-system.

Interactions with the hardware module may be accomplished through library and multimedia framework 256 and application programming interfaces (APIs) 257. The library and multimedia framework 256 may provide access to hardware subsystems through various operating system kernel level frameworks, such as plug-and-play mechanisms, power management mechanisms and other mechanisms. The library and multimedia framework 256 may also provide access to hardware subsystems through various libraries. The libraries may include dynamic link libraries (DLLs), libraries of generic device drivers, libraries of device specific device drivers, libraries of support functions for device drivers such as timers and debuggers. The API 257 may provide higher level software interfaces, such as function calls and other interfaces that provide access to the hardware subsystems. Access may be provided through mechanisms, including user-mode mechanisms, such as software function calls, operating system services, direct device function calls. The access mechanisms may allow software control of hardware subsystems through the device drivers, operating system, and support services. Access to the hardware subsystems may be provided not only to the multimedia applications, but to other applications and systems including the multimedia parameter manager and data flow tracer. In aspects, access may be used to override the multimedia parameters of the hardware subsystems.

In various aspects, the concurrent application block 250 and the hardware block 270 may be coupled to the library and multimedia framework 256 and the APIs 257. The coupling between the concurrent application block 250, the hardware block 270, the library and multimedia framework 256, and the APIs 257 may be in the form of software coupling through operating system services, inter-process messages, and/or function calls to various hardware subsystems from various ones of the concurrent multimedia applications, or through similar mechanisms. The function calls or other coupling mechanisms, may allow the multimedia applications in the concurrent application block 250 to receive data from, pass data to and among various hardware subsystems and other multimedia applications and along data flow paths. The function calls or other coupling mechanisms, may further allow the multimedia applications in the concurrent application block 250 to configure the various hardware subsystems in the hardware block 270. Some or all of the function calls or other coupling mechanisms made by applications in the concurrent application block 250, and corresponding paths established for the flow of multimedia data, including the hardware elements of the hardware block 270 may form the data flow path for the various multimedia data flows described herein. The data flow paths may further include data flow to and from a network module that enables communication, including bidirectional communication, with one or more other devices over a network connection 207.

The device 205 may further include a sensor block 206 that may provide sensor input data 206a to the multimedia parameter manager and data flow tracer 260. While for ease of description the sensor block 206 is shown as a single block, the sensor block 206 may represent one or more sensor inputs such as a temperature input, a power input, or other input as described hereinabove. The multimedia parameter manager and data flow tracer 260 may designate priorities to various ones of the data flows associated with the applications in the concurrent application block 250. The priorities may be periodically updated or adjusted. When the value of the sensor input data 206a reaches or exceeds a threshold value, the multimedia parameter manager and data flow tracer 260 may adjust multimedia parameters associated with the data flows, such as a resolution, frame rate, LoD based on the designated priorities. For example data flows with low priority may experience reductions and multimedia parameter such as resolution, frame rate, LoD, or other parameters, before or instead of data flows with higher priorities.

In an aspect, reduction, restoration, or adjustment of the multimedia parameters may be accomplished at the device driver level through a connection 261, which may be a software or logical connection between ones of the device drivers 258 and the multimedia parameter manager and data flow tracer 260. Specifically, the multimedia parameter manager and data flow tracer 260 may be configured to monitor multimedia parameter values various hardware subsystems in hardware block 270. The multimedia parameter manager and data flow tracer 260 may further be configured with logic to override or reduce the value of certain multimedia parameters of hardware devices or subsystems along a data flow path when power related levels, such as temperature and power inputs, exceed thresholds or limits. The multimedia parameter manager and data flow tracer 260 may restore the value of the multimedia parameters when the power related levels fall below the thresholds or limits.

For example, the multimedia parameter manager and data flow tracer 260 may determine a priority associated with the data flow path and may determine whether multimedia parameter values have been reduced for hardware blocks along the data flow path. When the power related values fall below thresholds or limits, the multimedia parameter manager and data flow tracer 260 may restore the original or native value of the multimedia parameter of the highest priority hardware blocks that have experienced a reduction in the multimedia parameter value.

In aspects, the device drivers 258 may notify the corresponding applications in the concurrent application block 250 of the reduction or restoration of the value of the multimedia parameter through connections 262a through 267a, such as software connections, interprocess communication mechanisms, or other logical connections to the various ones of the multimedia applications. For example, the multimedia applications may be notified through signals or other mechanisms provided through the respective device drivers 258. Alternatively, the library and multimedia framework 256 and the APIs 257 may provide a mechanism through which the hardware may be controlled and through which notification of multimedia parameter changes may be provided to the multimedia applications. Notification of the multimedia applications in the applications block 250 may become necessary or desirable because of the difference between the settings that are asserted and expected by the multimedia applications in the applications block 250 and the override settings asserted by the multimedia parameter manager and data flow tracer 260. In particular, when applications can reduce the expected value for multimedia parameters in response to a notification, additional processing that may otherwise be required to compensate for the difference between the expected and the reduced values of the multimedia parameters may be eliminated.

Figure 3A:
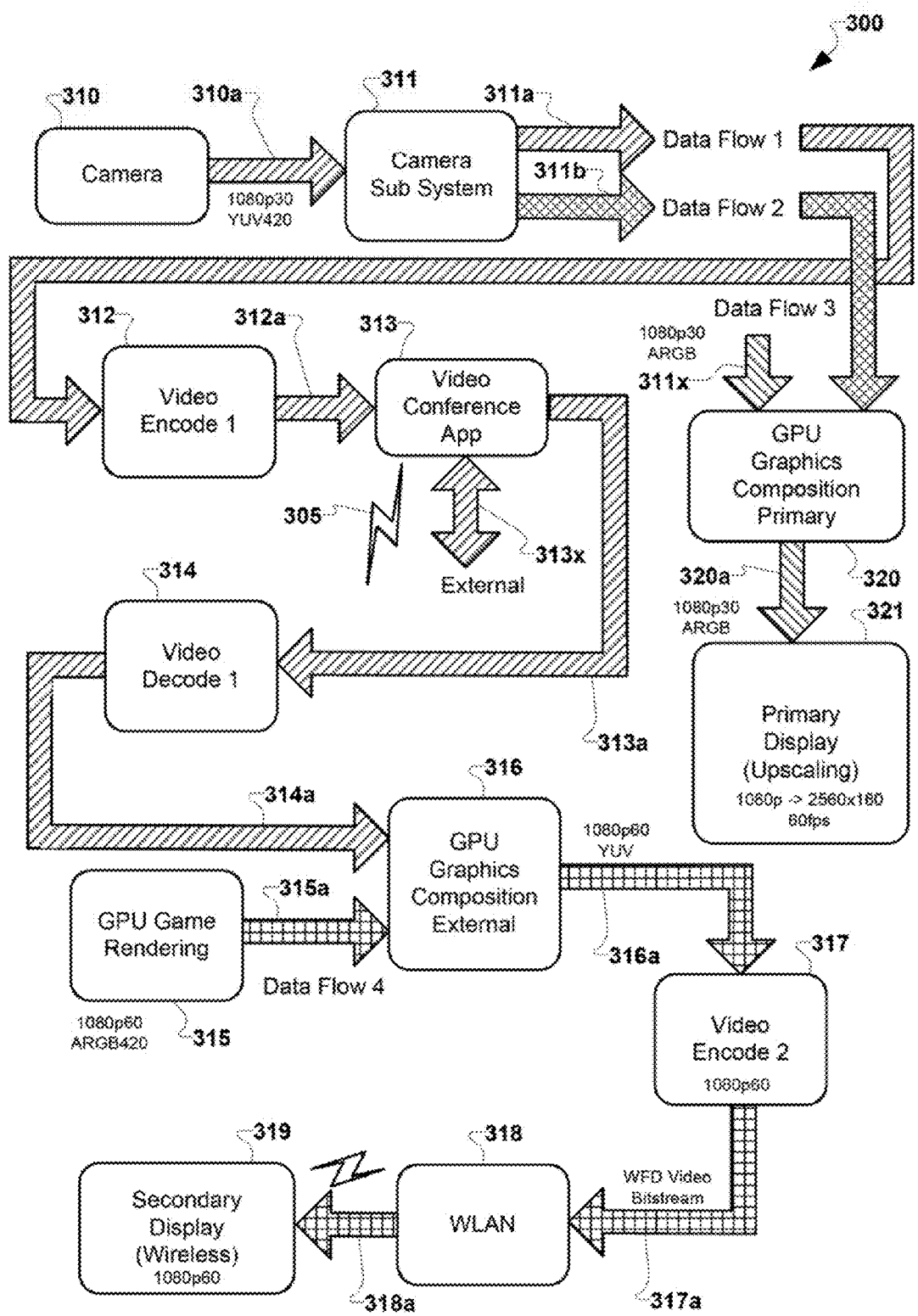
FIG. 3A is a diagram illustrating hardware subsystems and data flow paths in various aspects.

To better understand data flow path tracing in accordance with aspects, an example 300 including various data flows and data flow paths that span various hardware subsystems is illustrated in FIG. 3A. In aspects, a camera 310 may generate raw video data according to a give multimedia parameter, such as 1080p30 YUV 420, to form video data 310a. The video data 310a may be generated, for example at a maximum frame rate and resolution that the camera 310 is capable of generating. Alternatively, the video data 310a may be generated at whatever resolution and frame rate the camera 310 is currently configured at a hardware level to generate. The video data 310a may be coupled to a camera subsystem 311, which may process the video data 310a to form a data flow 1 311a and a data flow 2 311b at the original multimedia parameter, such as 1080p30 YUV 420.

In various aspects, the data within the data flow paths may be packet data that includes a series of encapsulated headers as data packets traverse various hardware modules. The packet header information may be used to identify the various hardware modules that the packet has traversed. Further, applications and data flows may be identified with various mechanisms such as process identifiers, thread identifiers, context identifiers. Device drivers and operating system services may be used to track the contexts, processes and threads associated with the hardware modules. Using the above information, the multimedia parameter manager and data flow tracer may track the various hardware modules associated with each application and data flow to establish the data flow path through the hardware subsystems in the SoC.

The data flow 311a and the data flow 311b may be video data flows having parameters such as resolution and frame rate, which may be configurable through interaction with the camera subsystem 311 as described herein. The data flow 1 311a may be logically coupled to a video encoder a 312, which may generate an encoded data flow 312a that may be further logically coupled to, for example, a video chat or a video conferencing app 313. The encoded data flow 312a may be transferred as external flow 313x, for example, over a wireless link 305, to another device, such as the device on the other end of the video conferencing app 313 according to one or more multimedia parameters, such as a resolution and a frame rate. The video conferencing app 313 may also receive encoded video from the external flow 313x, which may be transferred as encoded data flow 313a to a video decoder 314, where a decoded data flow 314a may be generated. Header information for data packets of the data flow 311a, 311b, 312a, 313a, 313x, 314a or other data flows may be examined at any point to determine information such as where the packet has been already, where the packet is destined and other information. Each device or hardware subsystem may append information within a packet header identifying itself and other information such as a timestamp.

The decoded data flow 314a may be transferred to a graphics processing unit (GPU) 316, which may be associated with generating secondary graphics compositions for external devices. The GPU 316 may also receive a graphics data flow 315a generated from a GPU game rendering block 315, which may operate in connection with a game application or the like according to multimedia parameters such as resolution, frame rate, LoD, or other parameters. The GPU 316 may generate a video data flow 316a, which may be a composite of the graphics data flow 315a and the decoded data flow 314 such that the concurrent multimedia data may be displayed together according to multimedia parameters that are compatible with an external display device, such as 1080p60 YUV. The video data flow 316a may further be logically coupled and transferred to a video encoder 2 317, which may encode the composite video data flow 316a and generate a video bitstream. The video bitstream may include a WFD video bitstream compatible with an external display device, such as a WFD video data flow 317a. The WFD video data flow 317a may be transferred to a WLAN module 318. The WLAN module 318 may transfer the video bitstream as a wireless video data flow 318a to a secondary wireless display 319. The data flow 2 311b may be configured according to one or more multimedia parameters, such as 1080p30 YUV 420, and may be logically coupled to a GPU 320 associated with generating primary graphics compositions for local primary display. The GPU 320 may also receive data from an external data flow 311x, such as from a device coupled through a network connection. The external device may be executing one or more multimedia applications, such as a game application and a teleconferencing application which may generate multimedia data for the external data flow 311x according to one or more multimedia parameter values such as 1080p30 ARGB.

Figure 3B:
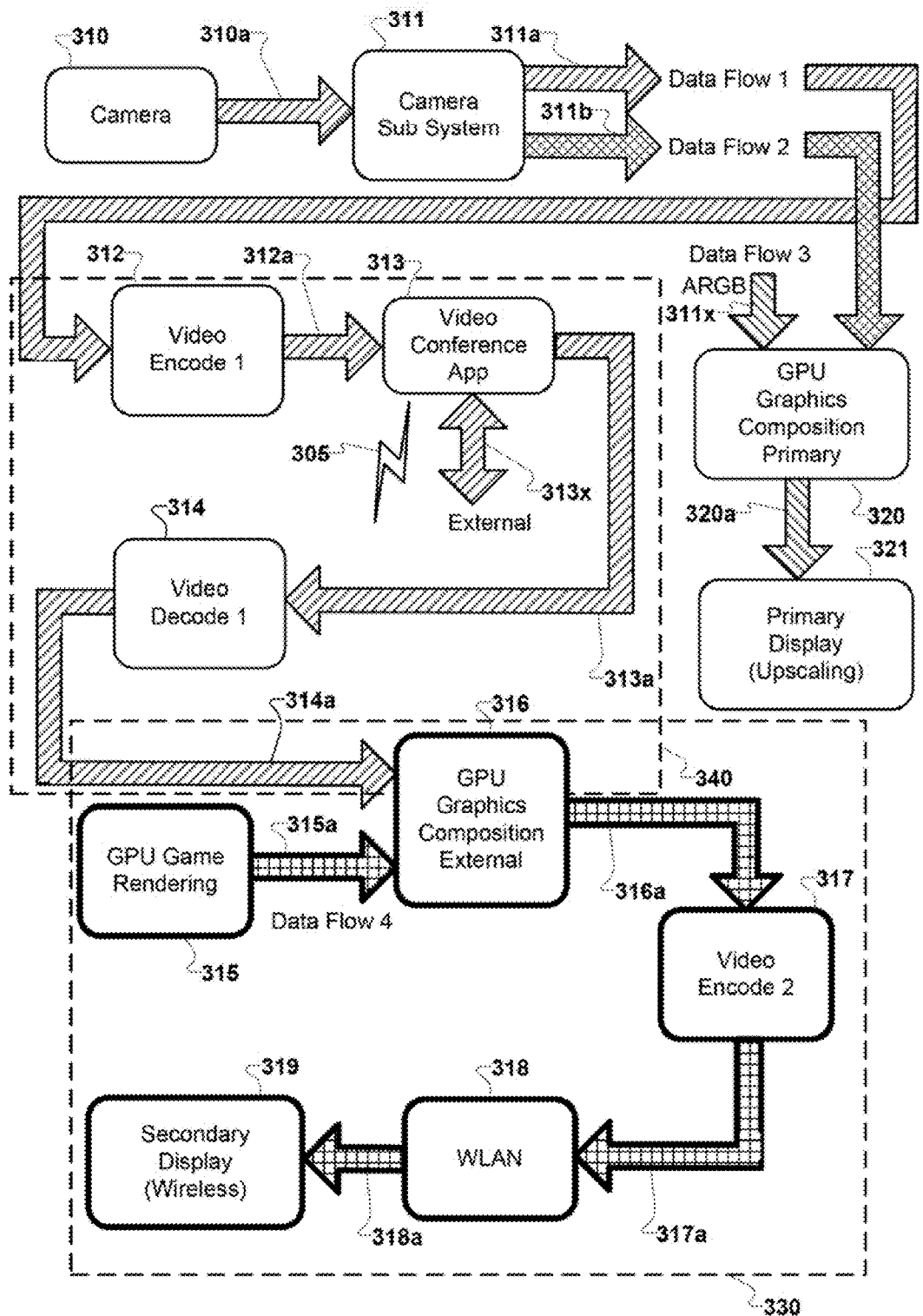
FIG. 3B is a diagram illustrating hardware subsystems and data flow paths and a high priority data flow and data flow path including hardware subsystems in various aspects.

When data flow paths are traced and priorities are assessed as described herein, specific hardware subsystems that are present in the data flow paths may be identified and associated with specific data flows based on priorities. As illustrated in FIG. 3B, a data flow path having a group of hardware subsystems may be included in a data flow path trace 330. The data flow path trace 330 may include, for example, the game rendering block 315, the graphics flow 315a, the GPU 316, the video data flow 316a, the video encoder 2 317, the WFD video data flow 317a, the WLAN module 318, the wireless video data flow 318a and the secondary wireless display 319, as highlighted in the figure. The elements in the data flow path trace 330 may be assigned a specific priority or may be otherwise identified for the purpose of adjusting the multimedia parameters for the hardware or software blocks, such as the graphics rendering module 315, the GPU 316, the video encoder 2 317, the WLAN module 318 and the secondary display 319. By adjusting the multimedia parameters of these blocks, the multimedia parameters of the data flows may correspondingly be adjusted. Further, data flow paths may be traced and prioritized, and updated as conditions change, for all the data flows associated with the concurrent multimedia applications. Updating data flow paths and priorities may be particularly useful as multimedia applications are newly executed or terminated.

In aspects, the data flow path trace 330 may include a hardware module, such as the GPU 316, with a coupling to another data flow path 340 or portion thereof. The data flow path 330 and the data flow path 340 may both include the decoded video flow 314a. The decoded video flow 314a, in aspects, may not be part of the data flow path trace 330, which may be designated as a high priority data flow. As such, a multimedia parameter for the data flow path trace 330 should be reduced only after low priority data flow paths are fully reduced. Because the data flow path trace 330 is a high priority data flow, the decoded video flow 314a, although coupled to a hardware module within a high priority data flow path trace 330, may be omitted from the data flow path trace 330. Instead, the decoded video flow 314a may be designated as part of the data flow path 340, which may be designated with a low priority. The data flow path 340 may become subject to multimedia parameter reduction before the higher priority data flow path 330 in accordance with aspects described herein.

In the present example, the video flow 314a may have a multimedia parameter thereof reduced, such as a resolution, frame rate, LoD or other parameter. The video flow 314a may be input to the GPU 316 with the reduced multimedia parameter, although the current multimedia parameter for output of the GPU 316, may not be reduced. The video flow 314a (e.g., with reduced multimedia parameter) will appear in the output of the GPU 316, which output may be generated at the full multimedia parameter value. However, the effective output of the video flow 314a will be that of having the reduced parameter. Alternatively, in some instances, although the multimedia parameter value of the video flow 314a is reduced, the GPU 316 may attempt to rescale the video flow 314a to provide an improved output. The portion of the GPU 316 that is associated with the data flow path trace 330, including the graphics flow 315a from the graphics rendering module 315, which may be designated with a high priority, may be displayed with the native or original multimedia parameter value such as resolution, frame rate, LoD or other parameter.

Figure 3C:
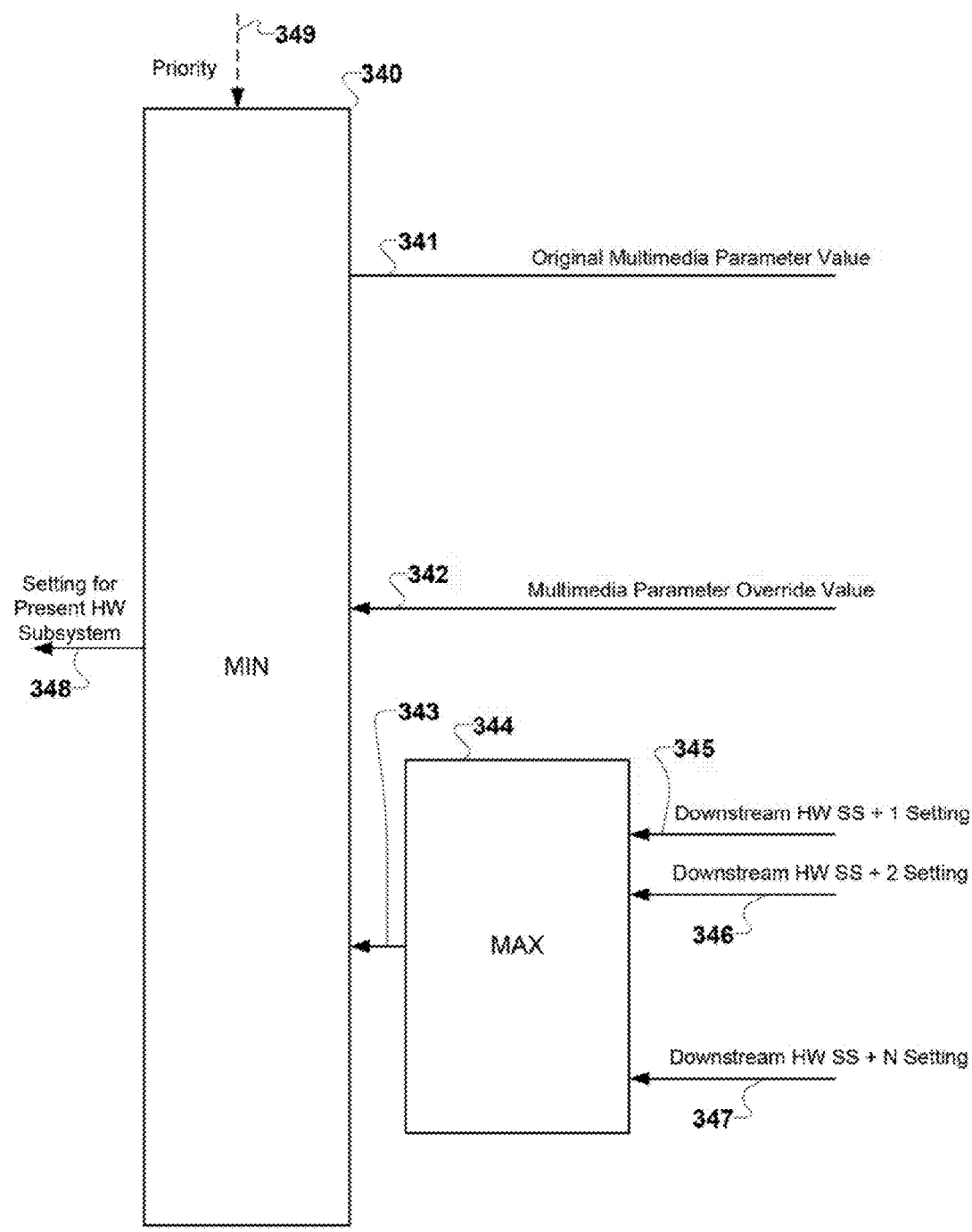
FIG. 3C is a diagram illustrating logic for establishing a multimedia parameter setting for a present hardware subsystem in various aspects.

Establishing settings for each of the hardware subsystems along a traced data flow path may be accomplished according to logic as illustrated in FIG. 3C. The illustrated logic is exemplary in nature and may be implemented in a variety of ways including as hardware logic, processing logic, logic implemented in a software module, or other ways. The logic may be used by the multimedia parameter manager and data flow tracer to make decisions as to the current or present multimedia parameter settings for each of the hardware subsystems in the data flow path. A logic block 340 may be configured to receive inputs and provide an output for the current multimedia parameter setting for the current hardware subsystem. The logic block 340 may receive an input 341 corresponding to the native or original multimedia parameter value for the hardware subsystem. The original multimedia parameter value may include the value originally specified by a corresponding application with regard to a data flow, or possibly by the data flow. The logic block 340 may further receive an input 342 corresponding to an override value for the multimedia parameter. The override value may be an adjusted value of the multimedia parameter. The adjusted multimedia parameter may be established by the multimedia parameter manager and data flow tracer when temperature and/or power levels indicate that an adjustment or override is required to maintain operation within an established thermal or power budget. Alternatively, the adjusted multimedia parameter or override value may be made for other reasons. The logic block 340 may further receive an input 343 representing a result or output of the logic block 344.

The logic block 344 may receive an input 345 corresponding to the current multimedia parameter setting of a next downstream hardware subsystem in the data flow path. The logic block 344 may further receive an input 346 corresponding to the current multimedia parameter setting for a second downstream hardware subsystem in the data flow path that is after the next downstream hardware subsystem. The logic block 344 may receive additional inputs, such as an input 347 from an $N^{th}$ downstream subsystem along the data flow path corresponding to the current multimedia parameter setting for the $N^{th}$ downstream block. The logic block 344 may provide the maximum value among the multimedia parameter setting inputs 345, 346, and 347 as the input 343 to the logic block 340. Accordingly, the logic block 344 may allow for consideration of the highest multimedia parameter value for downstream blocks in an attempt to maintain the highest possible quality of user experience.

When the logic block 340 is receiving all of the multimedia parameter inputs 341, 342 and 343, and, optionally, other inputs such as a priority value 349, a multimedia parameter output 348 may be provided. In other aspects, priority is already known in the multimedia parameter manager and data flow tracer for various traced data flow paths. The logic block 340 may provide as the output 348, the minimum multimedia parameter value among the multimedia parameter inputs 341, 342, and 343. The multimedia parameter output 348 thus may become the multimedia parameter setting for the current hardware subsystem. In aspects, the logic illustrated in FIG. 3C may be applied in connection with adjusting multimedia parameter values for every hardware module or subsystem. The logic may be applied periodically, for example as changes occur to priorities, temperature and power values, or other conditions. Alternatively, the logic may be applied continuously so as to better adapt to changing conditions.

As noted, when temperature levels, power levels, or other inputs exceed thresholds for invoking power management, multimedia parameters may be reduced or adjusted for low priority data flows first, before multimedia parameters are reduced or adjusted for higher priority data flows. Conversely, when temperature levels, power levels, or other inputs fall below thresholds for invoking power management, multimedia parameters may be restored or adjusted for high priority data flows before being restored or adjusted for lower priority data flows and applications. Priorities may be established, maintained and updated for various data flows in a variety of ways, including by detecting which of the concurrent multimedia application windows are being viewed most often or for the most protracted periods of time.

Figure 4A:
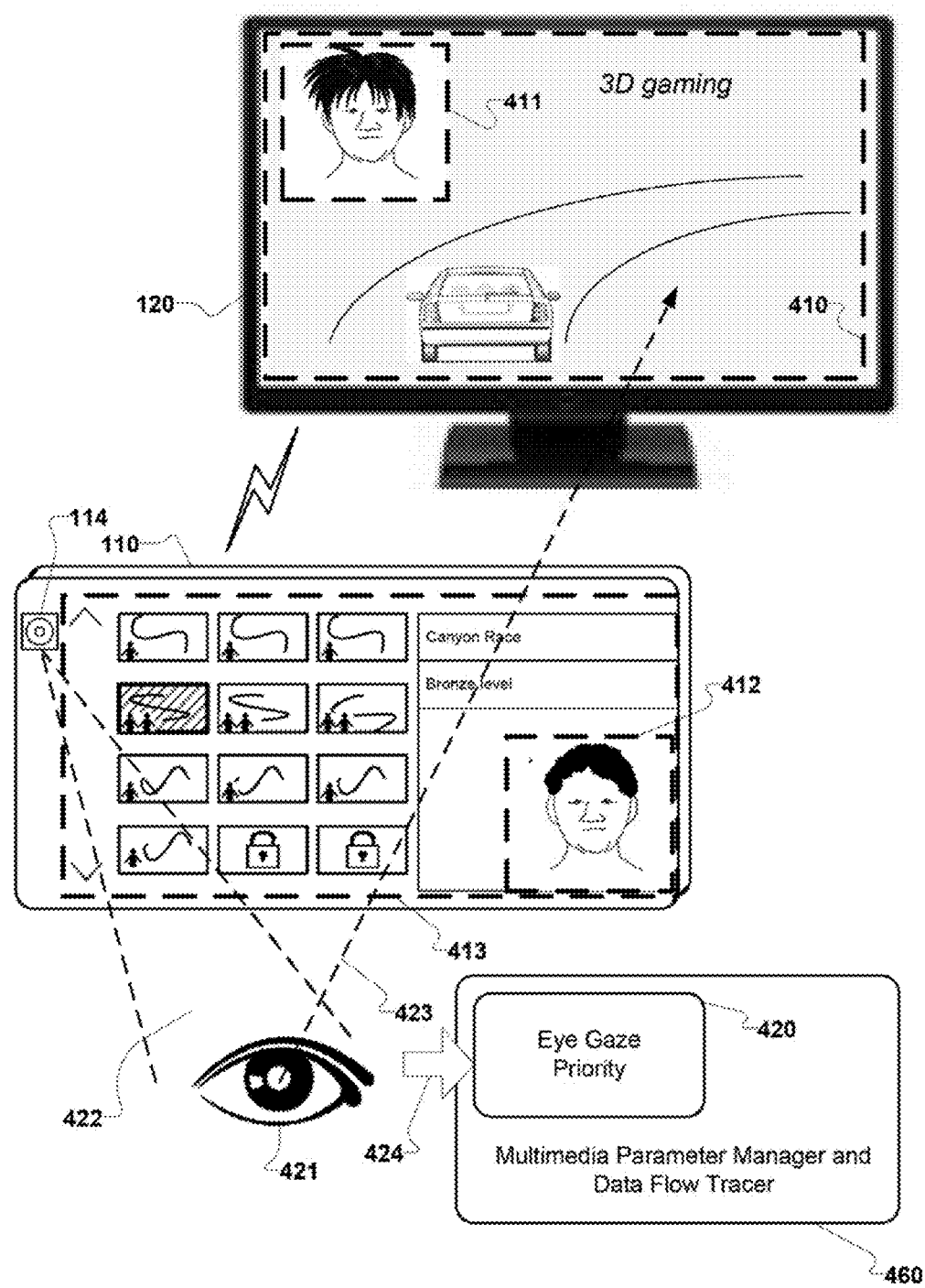
FIG. 4A is a diagram illustrating a device and concurrent multimedia applications including a camera and eye gaze detection for setting window priority in various aspects.

As illustrated in FIG. 4A, eye gaze detection and recognition may be used to determine priorities among the data flows for the concurrent multimedia applications. The first device 110 may use a camera 114 to monitor an eye 421 or eyes within an optical field 422 of the camera 114 in one more of a variety of manners. Statistics 424 associated with a fixation point 423 of the eye 421 or eyes may be input to an eye gaze priority module 420 to be collected and stored for the direction of the fixation point 423 during operation of the first device 110. The eye gaze priority module 420 may use eye gaze information, or may use eye gaze information in combination with other priority related information as described herein. The priorities may be made available to a multimedia parameter manager and data flow tracer 460. In an aspect, the eye gaze detection may use, for example, a center of the pupil and infrared or near-infrared non-collimated light to create corneal reflections (CR). A vector between the pupil center and the corneal reflections can be used to compute a point of fixation or a gaze direction. Other methods may be used to detect the gaze direction or point of fixation. It may further be necessary to conduct a calibration procedure to establish reference points for a user, which may be conducted, for example, during a setup procedure before eye gaze detection may be used.

Eye movement may be divided into two general categories, fixations and saccades. Fixation may occur when the gaze of the eye 421 or eyes pauses in a certain position. Saccades occur when the eye 421 or eyes is in the process of moving to another fixation position. A series of fixations and saccades may be referred to as a scanpath. For the purposes of establishing priorities for the data flows of the concurrent multimedia applications, information from the eye 421 or eyes associated with a fixation may be most useful in establishing statistics regarding which window the user is most often viewing or for the most prolonged duration. Fixations may typically last for around 200 ms to 350 ms, or may be longer or shorter depending on whether the user is, for example, reading text or viewing a scene. For interactive gaming sessions, and other applications requiring concentration and focus, the duration of fixation within a window associated with a game application, or other application, may be more prolonged.

In the present example, the fixation point 423 may be located within window 410, which may be associated with a game application. A party 1 window 411 of the teleconferencing application may be superimposed on a gaming window 410 of the game application on the external display 120. Additional windows, such as a party 2 window 412 of the teleconferencing application and the gaming control window 413 of the game application may be displayed on the first device 110. However, the duration of the focus of the gaze of the eye 421 or eyes on the fixation point 423 within the gaming window 410 may predominate during game play. While periodic eye gaze fixation on the teleconferencing application window 411, the party 2 window 412, or the gaming control window 413 may occur, statistics for the gaze fixation of the eye 421 or eyes may indicate that the user is focusing predominately within the gaming window 410 the gaming application and therefore the gaming application and the corresponding data flows may be identified as having a high priority.

When the priority information developed in the eye gaze priority module 420 are provided to the multimedia parameter manager and data flow tracer 460, data flow paths associated with the concurrent multimedia applications may be traced. Hardware subsystems and modules along the traced data flow paths may be identified for multimedia parameter adjustment as temperature, power and other sensor input levels, or other input levels rise and fall. As gaze statistics change, priorities may be updated. When the sensor input levels or other input levels rise and reach or exceed thresholds, power management may be invoked. Multimedia parameters along data flow paths associated with low priority data flows may be reduced or adjusted before higher priority data flows. When the sensor input levels or other input levels fall below the threshold levels, power management may be ceased. When power management is ceased, multimedia parameters for subsystems and modules along data flow paths associated with high priority data flows may be restored or adjusted before lower priority data flows.

Figure 4B:
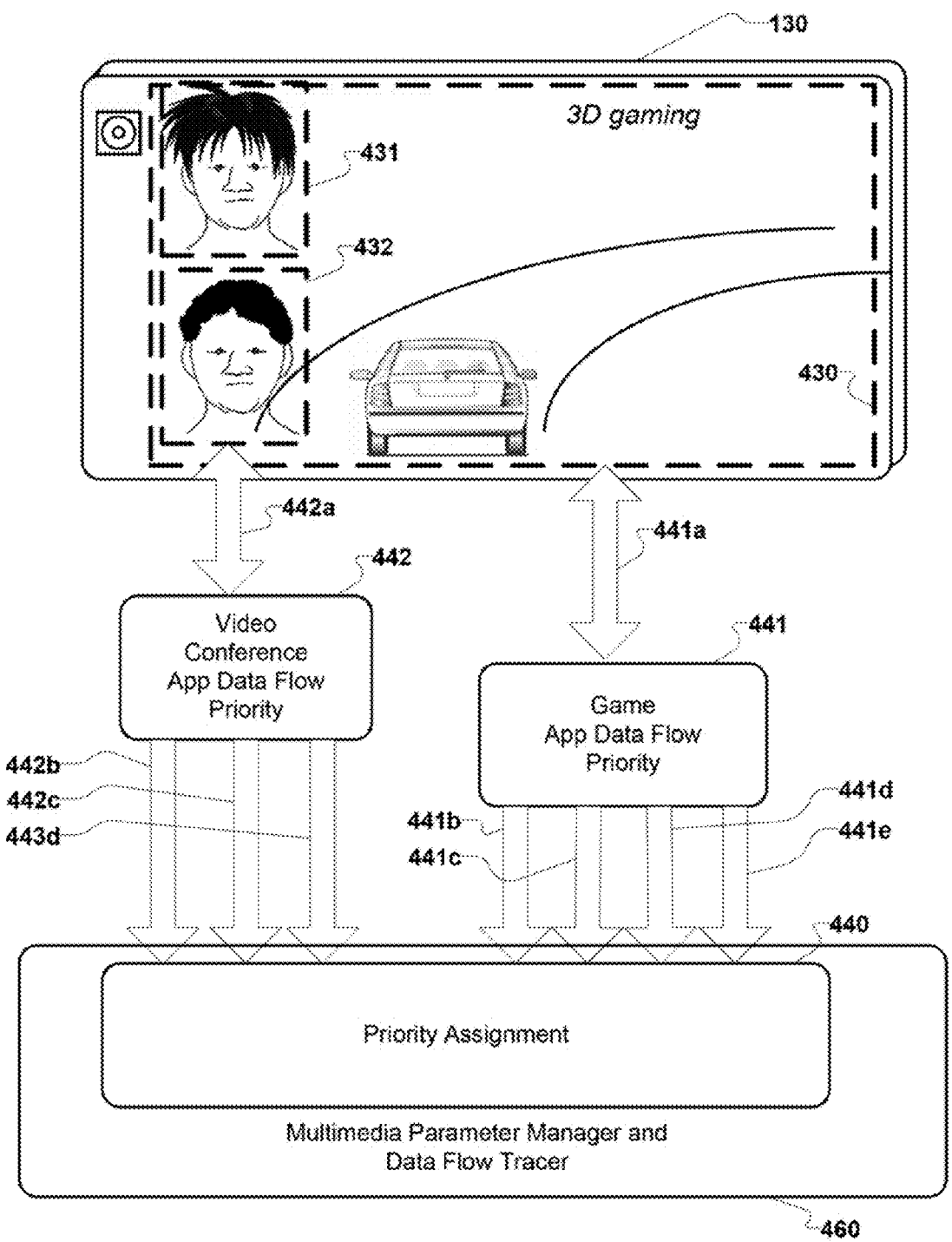
FIG. 4B is a diagram illustrating a device and concurrent multimedia applications including priority hints for setting window priority in various aspects.

In other aspects, as illustrated in FIG. 4B, concurrent multimedia applications may provide information to a priority assignment module 440, which may be configured to operate in connection with the multimedia parameter manager and data flow tracer 460. A second device 130 may be configured with concurrent multimedia applications such as a teleconferencing application with party 1 window 431 and party 2 window 432, which are displayed on the display of second device 130. The concurrent multimedia applications may also include a game application having a gaming window 430 on which graphics associated with the game are rendered and displayed on the display of second device 130. In aspects, the video teleconferencing application may provide information as to priority. The priority information may include priority hints 442a, which may be priority preferences, suggestions, requirements, or recommendations in connection with a video conference application data flow priority module 442.

Various hints, including hints associated with required or recommended multimedia parameters for one or more specific data flows 442b, 442c, and 442d, may be provided by the video conference application data flow priority module 442 to a priority assignment module 440 of the multimedia parameter manager and data flow tracer 460. The game application may further provide information, such as priority hints 441a which may be priority preferences, suggestions, requirements, and recommendations in connection with a game application data flow priority module 441. Various hints, including hints associated with required or recommended multimedia parameters for one or more specific data flows 441b, 441c, 441d and 441e, may be provided by the game application data flow priority module 441 to the priority assignment module 440 of the multimedia parameter manager and data flow tracer 460. The priority assignment module 440 may use the hint information to establish, maintain and update priorities associated with the data flows of the concurrent multimedia applications. The priority assignment module 440 may use the hint information in combination with other information including information from eye gaze detection statistics, or other priority related information. Non-limiting examples of additional priority related information, which may be used to establish and update priorities may include information regarding which of the windows of the concurrent multimedia applications occupies the greatest area of a display, which of the windows is "active" (e.g., currently receiving input from an input device), which window is providing the greatest amount of multimedia data, and so on.

Figure 5A:
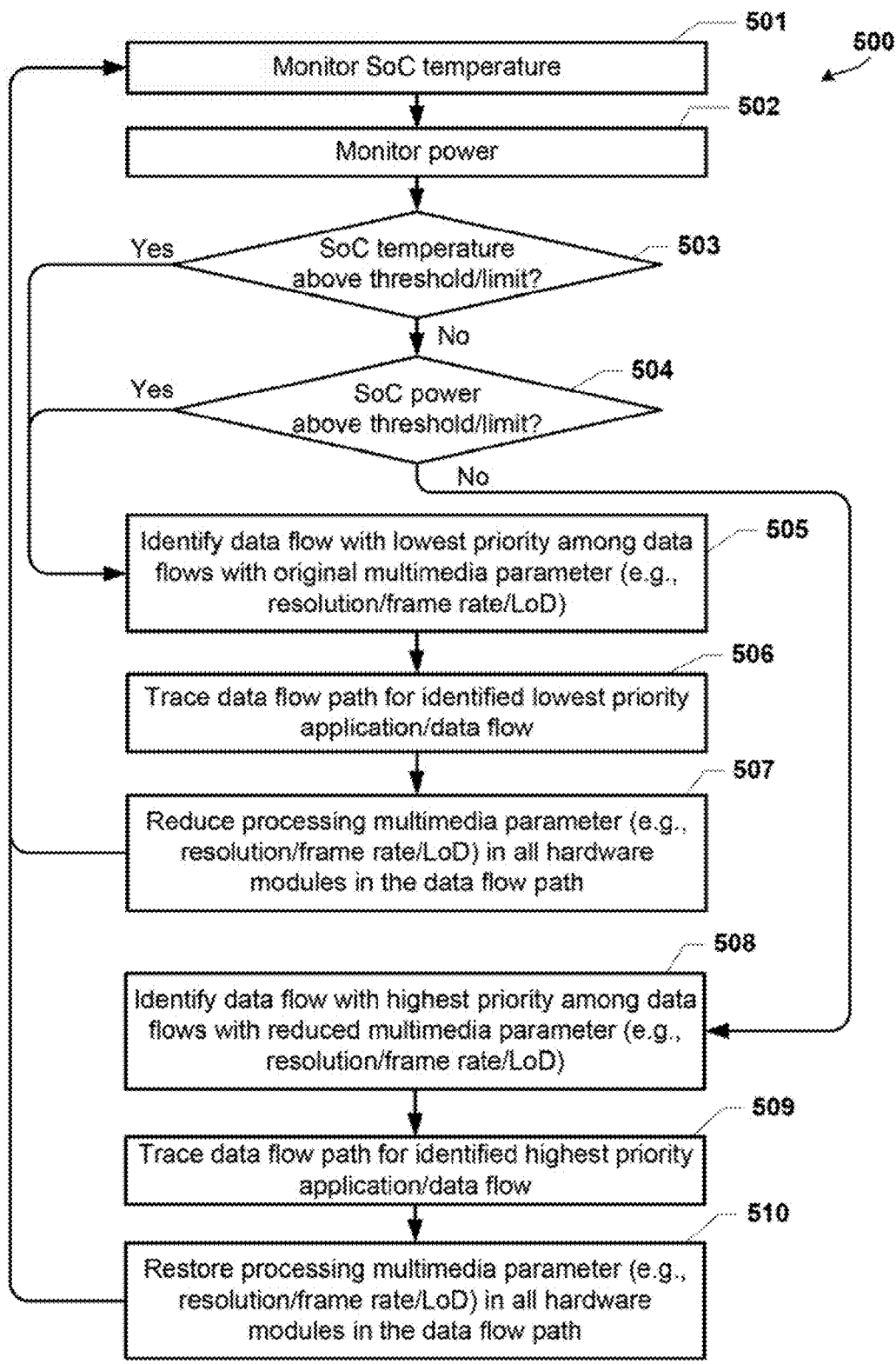
FIG. 5A is a process flow diagram illustrating an aspect method of multimedia parameter management and data flow tracing.

In an aspect method 500 illustrated in FIG. 5A, such as a method of managing data flows for concurrent multimedia applications executing on a device including a SoC in response to determining that one or more of a temperature exceeds a temperature threshold and a power consumption exceeds a power threshold. An operating device may monitor a temperature of the SoC in block 501. Temperature values may be obtained in real time as values measured by a sensor as described herein above. Temperature values may also be stored in registers, or as predicted values based on previously measured values or some combination. Further, the operating device may monitor power values of the SoC in block 502. Power values may be obtained in real time, for example, as a function of real time voltage, current, transmission power, or other measurements. Power values may further include stored power values, predicted power values, or values based on trends calculated from measured or stored values and other inputs that may be power affective. Non-limiting examples of alternative power values may include history values of previous power consumption levels. The previous power consumption levels may further be associated with past instances of executing ones of the concurrent multimedia applications under various conditions. Such previous power consumption information may allow current and future power levels for the same application to be predicted when it is newly launched or when it is currently executing and encountering similar conditions.

When the SoC temperature is at or above a threshold temperature level, such as a level that is predetermined or set so as to invoke system power management activities to reduce temperature levels when the level is met or exceeded (i.e., determination block 503="Yes"), actions may be taken to mitigate power consumption. When the SoC temperature is not above a threshold temperature (i.e., determination block 503="No") and the SoC power is at or above a threshold power level (i.e., determination block 504="Yes"), actions may also be taken to mitigate power consumption. The threshold level may include a level that is predetermined or set so as to invoke system power management activities to reduce power levels when the level is met or exceeded.

In an aspect, to mitigate power consumption, one or more of the data flows of the concurrent multimedia applications having the lowest priority among data flows that have not experienced multimedia parameter reduction may be identified in block 505. The priority of the data flow may be directly related to the impact on the user experience that a reduction in one or more multimedia parameters would cause. Further, when the data flow having the lowest priority is identified, additional ones of the data flows of the concurrent multimedia applications with the next highest priority may be identified, and so on, until all concurrent multimedia data flows may have a priority assigned thereto. In aspects, priorities may be continuously or periodically adjusted and updated during device operation as new concurrent multimedia applications are launched, terminated, or as the user switches focus to different ones of the applications.

When the data flow having the lowest priority is identified, a data flow path may be traced for the identified data flow in block 506. In one aspect, data flow paths may be traced, for example, by tracing physical data flow paths. As noted, each packet associated with the data flows may contain a header or a series of encapsulated headers identifying each of the hardware modules or subsystems that the packet has traversed. The packet header information may further identify source and destination addresses of hardware modules or subsystems along the data flow path for the packet. Tracing physical flow paths may involve identifying the packet source and destination addresses and associating the addresses with the hardware modules or subsystems within the data flow or data transfer paths. Thus, the hardware modules or subsystems involved in receiving and transferring multimedia data throughout the SoC for specific data flow paths may be identified. Hardware elements that are accessing (e.g., reading or writing) the packets may be identified by monitoring various processor resources such as registers or other mechanisms for transferring packets. Alternatively the hardware elements may be identified by independently reading the packet header information, such as by the multimedia parameter manager and data flow tracer.

In other aspects, data flow paths may be determined in advance based on an analysis of the application code to determine various kernel related calls to or associated with various hardware elements for specific multimedia data flows or streams. In other aspects, multimedia data flows may be provided with flow identifiers that may assist in identifying the data flow paths and hardware elements within the data flow paths. In aspects, the data flow paths may be continuously or periodically traced and updated during device operation as new concurrent multimedia applications are launched, terminated, or as the user switches focus to different ones of the applications.

When the data flow path has been traced to identify the hardware elements along the data flow path, one or more multimedia parameters, such as resolution, frame rate, LoD, or other parameter may be reduced for all of the hardware elements along the data flow path in order to lower the power consumption in block 507. Reducing the multimedia parameter may include reducing a resolution, frame rate, LoD or other parameter associated with an image or video stream capture device such as a camera, reducing the selected resolution or frame rate of a camera subsystem, or other mechanism for affecting a reduction in the multimedia parameter or parameters. Such a reduction may involve overriding an existing setting previously made, for example, by one of the concurrent multimedia applications. The reduction may be accomplished, for example, through interaction with a device driver for the associated hardware subsystem by a multimedia parameter manager and data flow tracer module that is configured to work in concert with the operating system.

When the multimedia parameter is reduced, the multimedia parameter manager and/or the affected device driver may be configured to provide a notification to the relevant application or applications. The notification may indicate that the parameter has been reduced for the purposes of implementing power management measures. Alternatively, the application may remain unaware that such as reduction has taken place. When notified of the reduction, the application may provide a notification to the user. The user may have the opportunity to determine which applications may be selected for reduction or which applications may be closed entirely to improve power consumption performance. After the multimedia parameter is reduced for the identified data flow path, processing may return to continue monitoring temperature and power. The process may continue to iterate for additional applications and/or data flow paths should temperatures and power levels remain above the thresholds. It may also be beneficial to delay the reduction of multimedia parameters for additional applications and/or data paths until the effectiveness of current reductions in lowering temperature and power levels can be determined. Alternative, a parameter reduction threshold and a parameter restoration threshold that is lower than the parameter reduction threshold may be established to provide a level of hysteresis.

When the SoC temperature is not at or above a threshold temperature level (i.e., determination block 503="No"), and when the SoC power is not at or above a threshold power level (i.e., determination block 504—"No"), actions may be taken to restore multimedia parameters. Actions may be taken when SoC power is below the threshold power level and continued operation at the present levels will not invoke power management measures. Multimedia parameter values may be restored in hardware elements in which multimedia parameters have been reduced. In aspects, it may also be beneficial to delay the restoration of multimedia parameters for hardware elements in which multimedia parameters have been reduced, until the effectiveness of current reductions in lowering temperature and power levels can be determined.

For example, in some aspects, multimedia parameters may be restored when it is determined that a restoration of the multimedia parameters will not lead to an immediate return of temperature or power levels that are above thresholds. Such a determination may involve, for example, an analysis of the trend of decline for monitored temperature or power levels. Alternatively, or in addition to analyzing trends, a fixed time or separate restoration threshold level may be established to provide an amount of hysteresis to prevent rapid cycling of parameter reduction or restoration measures, which would likely have an undesirable impact on the user experience. Alternatively, the degree of restoration or reduction of multimedia parameters may be adjusted such that power consumption levels converge on target levels. For example, small restorations or reductions may be made if temperature or power levels are only slightly below or above power threshold limits. When temperature or power levels are significantly below or above power threshold limits, greater restorations or reductions may be made.

When the temperature and the power levels are determined to be below the thresholds or limits, which may include being below the thresholds or limits for an amount of time, action to restore the multimedia parameters may be taken. Alternatively when the temperature and the power levels are determined to be below a restoration threshold level, action to restore the multimedia parameters may be taken. The data flows having the highest priority in which one or more multimedia parameters such as resolution, frame rate, LoD or other parameters, have been reduced in hardware elements along a traced data path, may be identified in block 508. For example, the multimedia parameter manager and data flow tracer may maintain information as to priorities and as to which hardware modules have experienced a reduction in multimedia parameters based on original or native parameters and current parameters.

Further, the data flow having the highest priority, in which one or more multimedia parameters has been reduced, may be identified. When the data flow with the highest priority is identified, additional ones of the data flows with the next lowest priority may be identified, and so on. Data flow priorities may be identified until all the data flows in which multimedia parameters have been reduced may be identified. Alternatively, such determinations may be made in subsequent iterations through the aspect method 500. When the data flows having the highest priorities, in which multimedia parameters have been reduced, have been identified, data flow paths may be traced for the identified data paths having associated priorities in block 509. Alternatively, the multimedia parameter manager and data flow tracer may have previously identified, traced and stored information regarding the relevant data flow paths.

When the data flow paths have been traced, the multimedia parameters for the hardware subsystems along the data flow paths may be restored to original or native values in block 510. When the multimedia parameter or parameters have been restored for the identified data flow path, processing may return to continue monitoring temperature and power. The process may continue to iterate for additional applications and/or data flow paths should temperatures and power levels remain below the thresholds. Iteration may continue until all multimedia parameters are restored to original or native values.

Figure 5B:
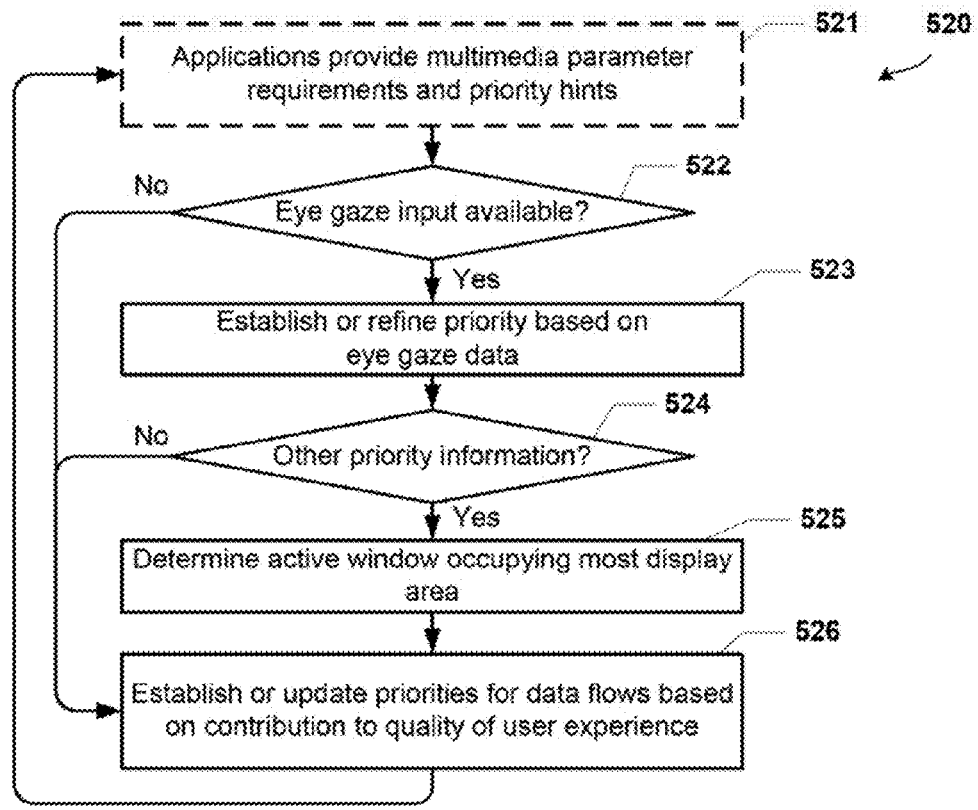
FIG. 5B is a process flow diagram illustrating an aspect method of establishing data flow priorities.

As described herein above, priorities may be established for data flows. In an aspect method 520, as illustrated in FIG. 5B, if available, the concurrent multimedia applications may provide information, for example, to the operating system or to the multimedia parameter manager and data flow tracer, as to the required, recommended or preferred values for the multimedia parameters such as resolution, frame rate, LoD or other parameters associated therewith in block 521. Providing such information may occur at application startup or execution, or may be provided upon request by the operating system or the multimedia parameter manager and data flow tracer. The multimedia parameters provided by the applications may include a preferred value, a required value, ranges of values, or may include a minimum value for the multimedia parameters that will provide an acceptable user experience. For example the applications may provide a preferred resolution, frame rate, LoD, and/or a minimum resolution, frame rate, LoD below which the user experience would become unacceptable. The concurrent multimedia applications may also provide recommended priorities, e.g. for optimum user experience. The multimedia parameter manager and data flow tracer may use the provided multimedia parameter information to establish priorities for the data flows. For example, if a first application indicates a preferred or recommended resolution range that extends below a required minimum resolution for a second application, the data flows for the first application may be assigned a lower priority because these data flows may tolerate a greater degree of resolution reductions than the data flows associated with the second application.

When initial resolutions and priorities are established, it may be determined whether eye gaze input is available. When eye gaze input is available (i.e., determination block 522="Yes"), the previously established priorities may be refined or updated, or new priorities may be established using the eye gaze input in block 523. Eye gaze input may include eye gaze statistics as described above or may be direct input from an eye gaze subsystem. The eye gaze statistics may take different forms. For example, the eye gaze statistics may be a collection of stored image histogram data, transform data, or other eye gaze-related data, for images in the data stream associated with the application. The eye gaze statistics may further be a collection or collections of groups of stored image histogram data that is continuously updated, that is collected at particular time periods, or that is segregated based on characteristics of the eye gaze information. Alternatively, it may be possible to monitor real-time eye gaze statistics or information or combine real-time information with stored eye gaze information.

When the priorities have been established, updated, or refined, it may be determined whether other priority information is available. When other priority information is available (i.e., determination block 524="Yes"), the other priority information may be used to establish, update or refine the existing priorities in block 525. The other priority information may include information as to the currently active window (e.g., window having control of or receiving input). The other priority information may further include information as to the window occupying the greatest display area. When all of the priority information has been provided, priorities for the data flows of all concurrent multimedia applications may be established based on the priority information in block 526. Additional information other than described above may also be used. For example, information may be available to determine a quality contribution of each of the concurrent multimedia applications on the user experience. However, to some extent, the priority information set forth hereinabove for the data flows may provide an indication of respective quality contributions. The quality contribution may be determined based on factors such as the values of the required multimedia parameters, the priorities, and other factors such as the level of required interaction and other heuristics. When the priorities are established for all data flows, the process may return to block 521 and continue to refine and update priorities by cycling through the process repeatedly during operation.

Figure 5C:
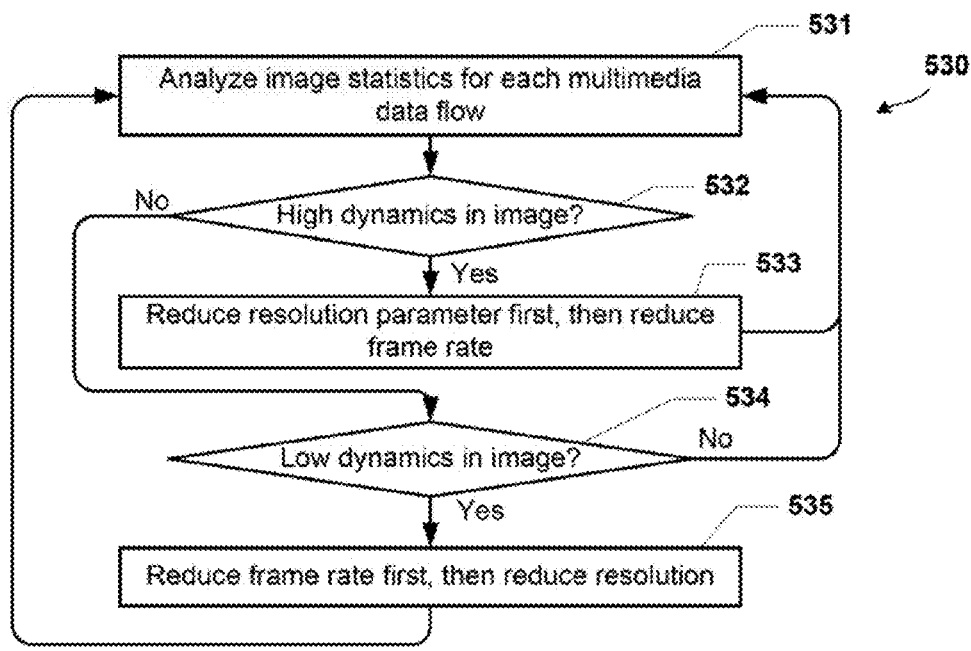
FIG. 5C is a process flow diagram illustrating an aspect method of selecting a first multimedia parameter between multimedia parameters for overriding.

Making adjustments to the multimedia parameters for certain data flows may be based on characteristics associated with the content of the data flow. In, an aspect method 530, as illustrated in FIG. 5C, the characteristics may be used to make decisions regarding which among the various multimedia parameters to adjust first. For example, in an aspect, resolution and frame rate, inter alia, may be identified as parameters that, when adjusted, may have different impact on quality of user experience for various ones of the concurrent multimedia applications based on certain characteristics of video or graphics data. The multimedia parameter manager and data flow tracer, or other processing module may be configured to analyze image statistics associated with each of the data flows associated with the concurrent multimedia applications in block 531 to determine the dynamical characteristics of the data content. Alternatively, real time analysis may be conducted on the content of a data flow associated with an application that has been identified as a candidate for parameter reduction (e.g., lowest priority).

The image statistics may include an image histogram or other statistics or information regarding factors associated with the images in a data flow, which are indicative of the presence or absence, and degree of image dynamics. The term "image dynamics" may refer to information such as change or motion for the successive images that make up the data flow of a video stream associated with a teleconferencing application or a graphics stream associated with a game application. Generally, the image statistics may be analyzed for similarities or differences between frames. Features of the images such as edges may be detected. Inter-frame movement of the features may be used to determine or indicate the dynamical characteristics of the data flow. Features may further include local maxima. The local maxima may be compared with background levels and inter-frame movement of the local maxima may be used to determine or indicate the dynamical characteristics of the data flow. Other features such as color, changes in the color, changes in the intensity of the color, or other features may indicate a level or degree of dynamic range in the data flow. For example, "wide" histograms associated with images may indicate a high dynamic range, while rapid inter-frame changes in the character of the histogram may indicate motion. The dynamical characteristics of the data may be assigned a value from a range or continuum of values. Thus, the dynamical characteristics of a frame, frames, or an entire data flow, may be evaluated relative to each other, e.g. as "higher" or "lower" than another. Alternatively, the values may be relative to a reference value or values.

When multimedia parameter reduction is necessary for a data flow, and high dynamics are present in the data flow (i.e., determination block 531="Yes"), a resolution parameter may be reduced first, then, if necessary, a frame rate parameter may be reduced in block 533. The reduction of resolution before frame rate may be performed during the same parameter adjustment operation or may be performed in subsequent parameter reduction operations as the process iterates. High image dynamics may generally be correlated to high levels of change or movement in the image associated with the underlying content. Further, the perceptual quality of display or rendering of image streams having high degrees of movement is most adversely affected by a reduction in the frame rate parameter. Thus, by reducing the resolution first, the perceptual quality of the displayed or rendered high-movement image stream may be advantageously preserved. When the resolution parameter is reduced, processing may return for further analysis in bock 531.

When high dynamics are not present in the images associated with the data flow (i.e., determination block 532="No"), it may be determined whether low dynamics are present in the images associated with the data flow. To discriminate between "high" and "low" values for the image dynamics, a threshold or thresholds may be established for the level of dynamics in the image statistics. When the level of dynamics is above a threshold or thresholds, the data flow may be designated as having high level of dynamics. When the level of dynamics is below a threshold or thresholds, the data flow may be designated as having a low level of dynamics. In aspects using two thresholds, an intermediate level of dynamics may occur resulting in the level of dynamics being designated neither high nor low, and either parameter may be reduced.

When low dynamics are present in the images associated with the data flow (i.e., determination block 534="Yes"), the frame rate may be reduced first, then, if necessary, a resolution parameter may be reduced in block 535. The reduction of frame rate before resolution may be performed during the same parameter adjustment operation or may be performed in subsequent parameter reduction operations as the process iterates. Low image dynamics may generally be correlated to low levels of change or movement in the image associated with the underlying content. Further, the perceptual quality of display or rendering of image streams having low degrees of movement is most adversely affected by a reduction in the resolution parameter. Thus, by reducing the frame rate first, the perceptual quality of the displayed or rendered low-movement image stream may be advantageously preserved. When the frame rate parameter is reduced, processing may return for further analysis in bock 531. When low dynamics are not present in the images associated with the data flow (i.e., determination block 534="No"), processing may return to block 531 for continued analysis of image statistics in block 531.

Figure 5D:
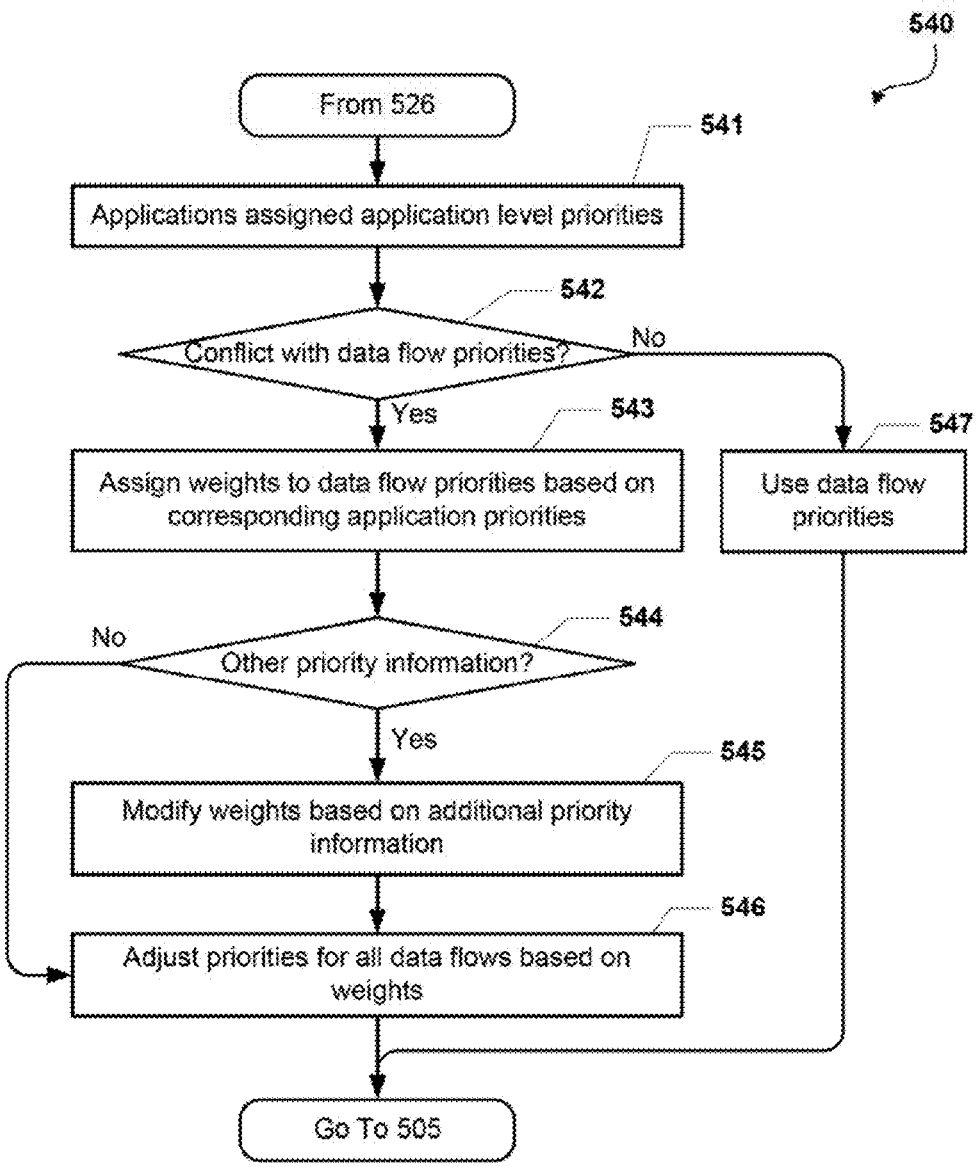
FIG. 5D is a process flow diagram illustrating an aspect method of adjusting data flow priorities based on application priorities.

Because some applications may have or support multiple data paths and applications may be assigned priorities (e.g., based on eye gaze, window position, etc.), an aspect method 540 illustrated in FIG. 5D may take into account application priorities to adjust data flow priorities appropriately. When data flow priorities have been established, such as in block 526 described above, the concurrent multimedia applications may also be assigned priorities in block 541. Application priorities may be based on operating system designations such as scheduling priorities for threads or processes associated with the applications, and may depend on a variety of factors, including operating system processes priorities, the status of the application processes, context switching and other considerations. The application priorities may change during execution of the applications depending on the status of each application and the class of its processes, such as idle, low priority, high priority, real time, and so on. There may also be priorities assigned to process threads within each process class.

To determine whether application priorities should be considered, the processor may determine whether the priorities associated with the applications conflict (i.e., are different from) the priorities established for the data flows in determination block 542. When the processor determines that application and data flow priorities conflict (i.e., determination block 542="Yes"), the processor may assign weights to data flow priorities based on the corresponding application priorities in block 542. For example, when priorities for a given concurrent multimedia application is relatively low but the established data flow(s) priorities for that application are relatively high compared to data flow(s)

priorities for a higher priority application, a lower weight may be assigned to the data flow(s) associated with the relatively low priority application.

The processor may also determine whether other priority information is available in determination block 544, such as eye gaze information or other information as described above with reference to FIG. 5B. When other priority information is available (i.e., determination block 544="Yes"), the weights assigned to data flows may be modified based on the additional priority information in block 545.

In block 546, the processor may use the assigned priorities to adjust the data flow priorities. In this operation, a data flow originally assigned a lower priority but assigned a high weighting factor based on the priority of its corresponding application may have its priorities increased, while a data flow originally assigned a higher priority but assigned a low weighting factor based on the priority of its corresponding application may have its priorities decreased. The adjusted data flow priorities may then be used in adjusting resources and controlling processes as described above, such as proceeding with the operations described above with reference to block 505 in FIG. 5A.

When the processor determines that application and data flow priorities do not conflict (i.e., determination block 542="No"), the priorities for the data flows may remain unchanged, and the original data flow priorities may be used in adjusting resources and controlling processes as described above, such as proceeding with the operations described above with reference to block 505 in FIG. 5A.

Figure 6:
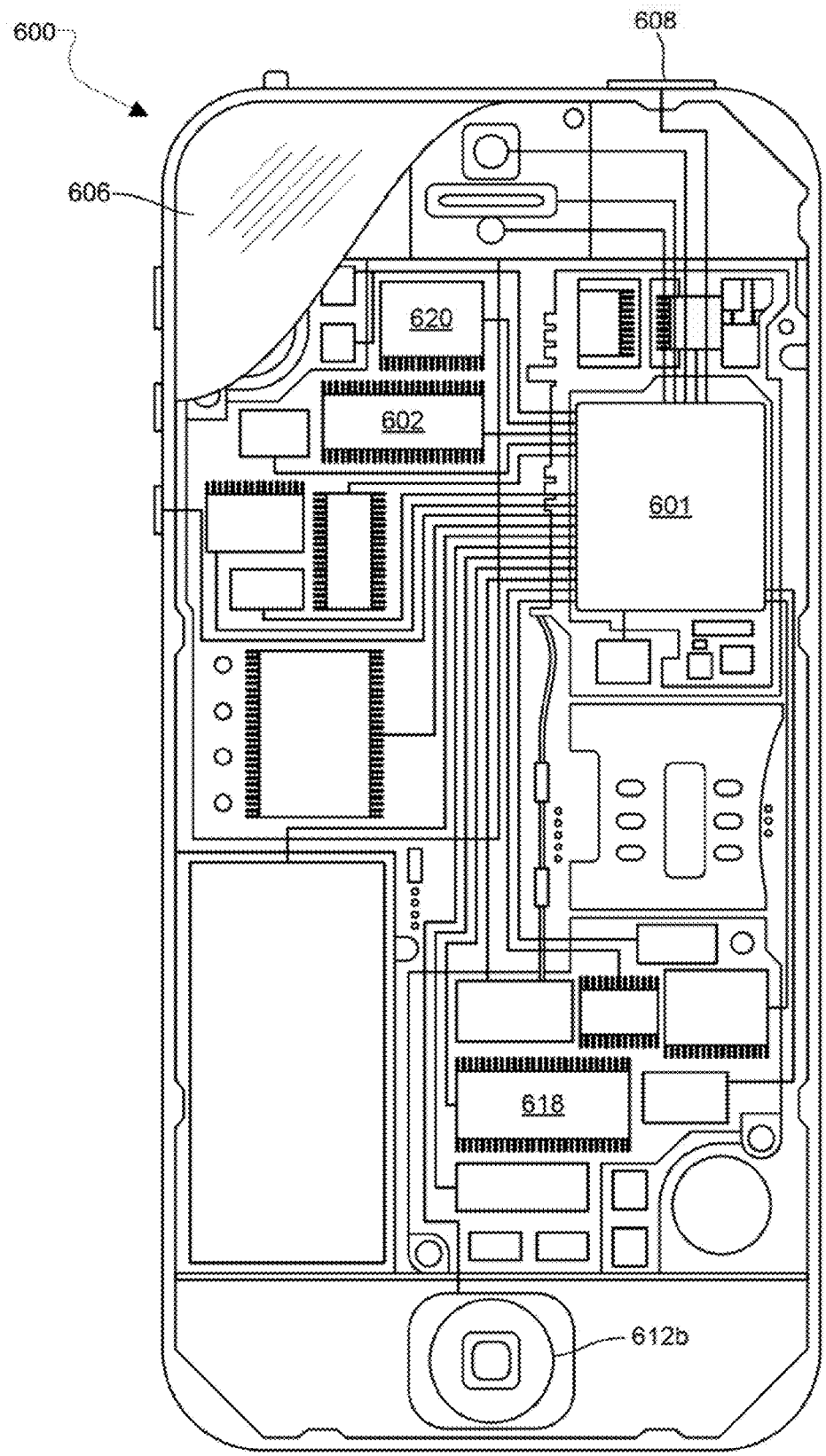
FIG. 6 is a block diagram illustrating an exemplary mobile device suitable for implementation of various aspects.

The various aspects described herein may be implemented in any of a variety of mobile computing devices (e.g., smartphones, feature phones, etc.), an example of which is illustrated in FIG. 6. For example, the mobile computing device 600 may include a processor 601 coupled to internal memory 602. The internal memory 602 may be volatile or non-volatile memory, and may also be secure and/or encrypted memory, or unsecure and/or unencrypted memory, or any combination thereof. The processor 601 may also be coupled to a touch screen display 606, such as a resistive-sensing touch screen, capacitive-sensing touch screen infrared sensing touch screen, etc. However, the display of the mobile computing device 600 need not have touch screen capability. The mobile computing device 600 may have one or more short-range radio signal transceivers 618 (e.g., Peanut, Bluetooth®, Zigbee®, RF radio) and antenna 608 for sending and receiving wireless signals as described herein. The transceiver 618 and antenna 608 may be used with the above-mentioned circuitry to implement the various wireless transmission protocol stacks/interfaces. The mobile computing device 600 may include a cellular network wireless modem chip 620 that enables communication via a cellular network. The mobile computing device 600 may also include physical buttons 612a and 612b for receiving user inputs.

Figure 7:
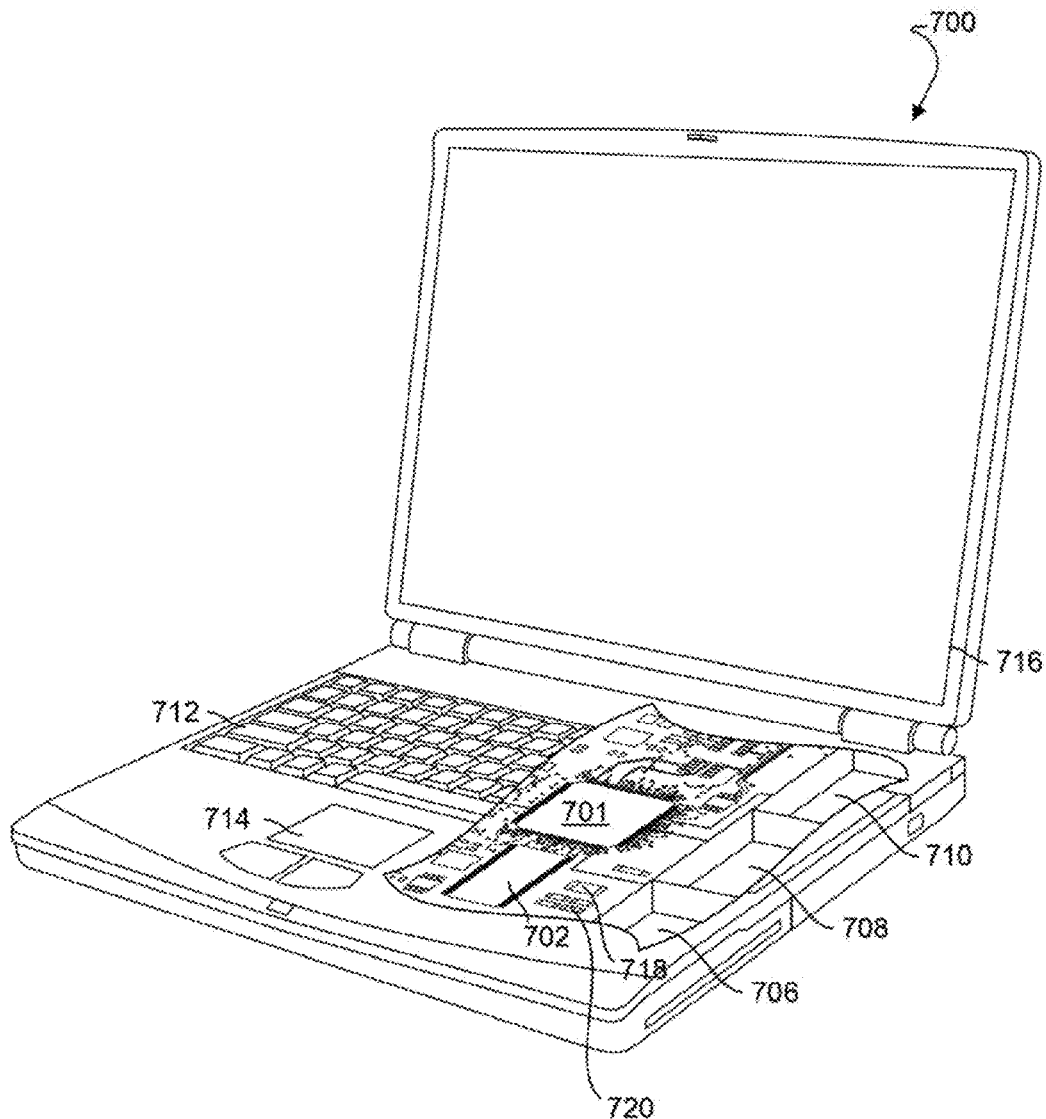
FIG. 7 is a block diagram illustrating an exemplary mobile computing device suitable for implementation of various aspects.

Other forms of computing devices, including personal computers and laptop computers, may be used to implement the various aspects. Such computing devices typically include the components illustrated in FIG. 7 which illustrates an example laptop computer device 700. Many laptop computers include a touch pad touch surface 714 that serves as the computer's pointing device, and thus may receive drag, scroll, and flick gestures similar to those implemented on mobile computing devices equipped with a touch screen display and described above. Such a laptop computer 700 generally includes a processor 701 coupled to volatile internal memory 702 and a large capacity nonvolatile memory, such as a disk drive 706. The laptop computer 700 may also include a compact disc (CD) and/or DVD drive 708 coupled to the processor 701. The laptop computer device 700 may also include a number of connector ports 710 coupled to the processor 701 for establishing data connections or receiving external memory devices, such as a network connection circuit for coupling the processor 701 to a network. The laptop computer device 700 may have one or more short-range radio signal transceivers 718 (e.g., Peanut®, Bluetooth®, Zigbee®, RF radio) and antennas 720 for sending and receiving wireless signals as described herein. The transceivers 718 and antennas 720 may be used with the above-mentioned circuitry to implement the various wireless transmission protocol stacks/interfaces. In a laptop or notebook configuration, the computer housing includes the touch pad 714, the keyboard 712, and the display 716 all coupled to the processor 701. Other configurations of the computing device may include a computer mouse or trackball coupled to the processor (e.g., via a USB input) as are well known, which may also be used in conjunction with the various aspects.

The processors 601 and 701 may be any programmable microprocessor, microcomputer or multiple processor chip or chips that may be configured by software instructions (applications) to perform a variety of functions, including the functions of the various aspects described above. In the various devices, multiple processors may be provided, such as one processor dedicated to wireless communication functions and one processor dedicated to running other applications. Typically, software applications may be stored in the internal memory 602 and 702 before they are accessed and loaded into the processors 601 and 701. The processors 601 and 701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 601 and 701 including internal memory or removable memory plugged into the various devices and memory within the processors 601 and 701.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the," is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more example aspects, the functions described may be implemented in hardware, software, firmware, or any combination thereof. If implemented in software, the functions may be stored as one or more instructions or code on non-transitory processor-readable medium. The steps of a method or algorithm disclosed herein may be embodied in a processor-executable software module which may reside on a non-transitory processor-readable storage medium. Non-transitory processor-readable storage media may be any available media that may be accessed by a processor or computer. By way of example, and not limitation, such non-transitory processor-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of managing power or temperature of a device including a system-on-chip (SoC) by managing data flows for concurrent multimedia applications, the method comprising:
    identifying a lowest priority data flow among the concurrent multimedia applications in response to determining that one or more of a temperature exceeds a temperature threshold and a power consumption exceeds a power threshold;
    tracing a data flow path for a data flow associated with the identified lowest priority data flow, the traced data flow path identifying all hardware modules traversed by the lowest priority data flow that operate using a multimedia parameter; and
    reducing the multimedia parameter of the identified hardware modules along the traced data flow path for the data flow associated with the identified lowest priority data flow, wherein the multimedia parameter includes at least one of a resolution and a frame rate of the data flow and wherein reducing the multimedia parameter of the identified hardware modules along the traced data flow path comprises:
        analyzing image statistics of the data flow to determine a level of dynamics associated with the data flow;
        reducing the resolution for the identified hardware modules along the traced data flow path in response to determining that the level of dynamics is above a threshold level; and
        reducing the frame rate for the identified hardware modules along the traced data flow path in response to determining that the level of dynamics is below the threshold level.

2. The method of claim 1, further comprising:
    restoring the multimedia parameter to the original value for the identified hardware modules along the traced data flow path for the data flow associated with the lowest priority data flow in response to determining that the one or more of the temperature and the power consumption no longer exceeds the temperature threshold or the power threshold.

3. The method of claim 1, further comprising establishing priorities among the data flows of the concurrent multimedia applications based on predetermined application priorities.

4. The method of claim 1, further comprising establishing priorities among the data flows of the concurrent multimedia applications based on eye gaze statistics indicating a window of concurrently displayed windows associated with the concurrent multimedia applications that is being fixated on most often.

5. The method of claim 1, further comprising establishing priorities among the data flows of the concurrent multimedia applications based upon a window of concurrently displayed windows associated with the concurrent multimedia applications that occupies a greatest area of a display.

6. The method of claim 1, further comprising:
    establishing priorities among the data flows of the concurrent multimedia applications based on one or more of: predetermined application priorities; eye gaze statistics indicating a window of concurrently displayed windows associated with the concurrent multimedia applications that is being fixated on most often; and a window of concurrently displayed windows associated with the concurrent multimedia applications that occupies a greatest area of a display; and
    adjusting the established priorities among the data flows of the concurrent multimedia applications based upon priorities assigned to the concurrent multimedia applications.

7. The method of claim 1, wherein the multimedia parameter further includes a level of detail (LoD) associated with the data flow.

8. The method of claim 1, wherein the concurrent multimedia applications include at least a teleconferencing application and a game application.

9. A computing device, comprising:
- a memory; and
- a processor coupled to the memory and configured with processor executable instructions to perform operations comprising:
  - identifying a lowest priority data flow among concurrent multimedia applications in response to determining that one or more of a temperature exceeds a temperature threshold and a power consumption exceeds a power threshold;
  - tracing a data flow path for a data flow associated with the identified lowest priority data flow, the traced data flow path identifying all hardware modules traversed by the lowest priority data flow that operate using a multimedia parameter; and
  - reducing multimedia parameter of the identified hardware modules along the traced data flow path for the data flow associated with the identified lowest priority data flow, wherein the multimedia parameter includes at least one of a resolution and a frame rate of the data flow and wherein reducing the multimedia parameter of the identified hardware modules along the traced data flow path comprises:
  - analyzing image statistics of the data flow to determine a level of dynamics associated with the data flow;
  - reducing the resolution for the identified hardware modules along the traced data flow path in response to determining that the level of dynamics is above a threshold level; and
  - reducing the frame rate for the identified hardware modules along the traced data flow path in response to determining that the level of dynamics is below the threshold level.

10. The computing device of claim 9, wherein the processor is configured with processor-executable instructions to perform operations further comprising:
- restoring the multimedia parameter to the original value for the identified hardware modules along the traced data flow path for the data flow associated with the lowest priority data flow in response to determining that the one or more of the temperature and the power consumption no longer exceeds the temperature threshold or the power threshold.

11. The computing device of claim 9, wherein the processor is configured with processor-executable instructions to perform operations further comprising establishing priorities among data flows for the concurrent multimedia applications based on predetermined application priorities.

12. The computing device of claim 9, wherein the processor is configured with processor-executable instructions to perform operations further comprising establishing priorities among data flows of the concurrent multimedia applications based on eye gaze statistics indicating a window of concurrently displayed windows associated with the concurrent multimedia applications that is being fixated on most often.

13. The computing device of claim 9, wherein the processor is configured with processor-executable instructions to perform operations further comprising establishing priorities among data flows of the concurrent multimedia applications based upon a window of concurrently displayed windows associated with the concurrent multimedia applications that occupies a greatest area of a display.

14. The computing device of claim 9, wherein the processor is configured with processor-executable instructions to perform operations further comprising:
- establishing priorities among data flows of the concurrent multimedia applications based on one or more of: predetermined application priorities; eye gaze statistics indicating a window of concurrently displayed windows associated with the concurrent multimedia applications that is being fixated on most often; and a window of concurrently displayed windows associated with the concurrent multimedia applications that occupies a greatest area of a display; and
- adjusting the established priorities among the data flows for the concurrent multimedia applications based upon weights associated with application priorities for one or more of the concurrent multimedia applications.

15. The computing device of claim 9, wherein the multimedia parameter further includes a level of detail (LoD) associated with the data flow.

16. The computing device of claim 9, wherein the processor is configured with processor-executable instructions to perform operations such that the concurrent multimedia applications include at least a teleconferencing application and a game application.

17. A computing device, comprising:
- means for identifying a lowest priority data flow among concurrent multimedia applications in response to determining that one or more of a temperature exceeds a temperature threshold and a power consumption exceeds a power threshold;
- means for tracing a data flow path for a data flow associated with the identified lowest priority data flow, the traced data flow path identifying all hardware modules traversed by the lowest priority data flow that operate using a multimedia parameter; and
- means for reducing the multimedia parameter of the identified hardware modules along the traced data flow path for the data flow associated with the identified lowest priority data flow, wherein the multimedia parameter includes at least one of a resolution and a frame rate of the data flow and wherein means for reducing the multimedia parameter of the identified hardware modules along the traced data flow path comprises:
  - means for analyzing image statistics of the data flow to determine a level of dynamics associated with the data flow;
  - means for reducing the resolution for the identified hardware modules along the traced data flow path in response to determining that the level of dynamics is above a threshold level; and
  - means for reducing the frame rate for the identified hardware modules along the traced data flow path in response to determining that the level of dynamics is below the threshold level.

18. The computing device of claim 17, further comprising:
- means for restoring the multimedia parameter to the original value for the identified hardware modules along the traced data flow path for the data flow associated with the lowest priority data flow in response to determining that the one or more of the temperature and the power consumption no longer exceeds the temperature threshold or the power threshold.

19. The computing device of claim 17, further comprising means for establishing priorities among data flows of the concurrent multimedia applications based on predetermined application priorities.

20. The computing device of claim 17, further comprising means for establishing priorities among data flows of the concurrent multimedia applications based on eye gaze statistics indicating a window of concurrently displayed windows associated with the concurrent multimedia applications that is being fixated on most often.

21. The computing device of claim 17, further comprising means for establishing priorities among data flows of the concurrent multimedia applications based upon a window of concurrently displayed windows associated with the concurrent multimedia applications that occupies a greatest area of a display.

22. The computing device of claim 17, further comprising:
means for establishing priorities among data flows of the concurrent multimedia applications based on one or more of: predetermined application priorities; eye gaze statistics indicating a window of concurrently displayed windows associated with the concurrent multimedia applications that is being fixated on most often; and a window of concurrently displayed windows associated with the concurrent multimedia applications that occupies a greatest area of a display; and
means for adjusting the established priorities among the data flows for the concurrent multimedia applications based upon weights associated with application priorities for one or more of the concurrent multimedia applications.

23. The computing device of claim 17, wherein the multimedia parameter further includes a level of detail (LoD) associated with the data flow.

24. The computing device of claim 17, wherein the concurrent multimedia applications include at least a teleconferencing application and a game application.

25. A non-transitory processor-readable medium having stored thereon processor-executable instructions configured to cause a processor to perform operations comprising:
identifying a lowest priority data flow among concurrent multimedia applications in response to determining that one or more of a temperature exceeds a temperature threshold and a power consumption exceeds a power threshold;
tracing a data flow path for a data flow associated with the identified lowest priority data flow, the traced data flow path identifying all hardware modules traversed by the lowest priority data flow that operate using a multimedia parameter; and
reducing the multimedia parameter of the identified hardware modules along the traced data flow path for the data flow associated with the identified lowest priority data flow, wherein the multimedia parameter includes at least one of a resolution and a frame rate of the data flow and wherein reducing the multimedia parameter of the identified hardware modules along the traced data flow path comprises:
analyzing image statistics of the data flow to determine a level of dynamics associated with the data flow;
reducing the resolution for the identified hardware modules along the traced data flow path in response to determining that the level of dynamics is above a threshold level; and
reducing the frame rate for the identified hardware modules along the traced data flow path in response to determining that the level of dynamics is below the threshold level.

26. The non-transitory processor-readable medium of claim 25, wherein the stored processor executable instructions are configured to cause a processor to perform operations further comprising:
restoring the multimedia parameter to the original value for the identified hardware modules along the traced data flow path for the data flow associated with the lowest priority data flow in response to determining that the one or more of the temperature and the power consumption no longer exceeds the temperature threshold or the power threshold.

27. The non-transitory processor-readable medium of claim 25, wherein the stored processor executable instructions are configured to cause a processor to perform operations further comprising establishing priorities among data flows of the concurrent multimedia applications based on predetermined application priorities.

28. The non-transitory processor-readable medium of claim 25, wherein the stored processor executable instructions are configured to cause a processor to perform operations further comprising establishing priorities among data flows of the concurrent multimedia applications based on eye gaze statistics indicating a window of concurrently displayed windows associated with the concurrent multimedia applications that is being fixated on most often.

29. The non-transitory processor-readable medium of claim 25, wherein the stored processor executable instructions are configured to cause a processor to perform operations further comprising establishing priorities among data flows of the concurrent multimedia applications based upon a window of concurrently displayed windows associated with the concurrent multimedia applications that occupies a greatest area of a display.

30. The non-transitory processor-readable medium of claim 25, wherein the stored processor executable instructions are configured to cause a processor to perform operations further comprising:
establishing priorities among data flows of the concurrent multimedia applications based on one or more of: predetermined application priorities; eye gaze statistics indicating a window of concurrently displayed windows associated with the concurrent multimedia applications that is fixated on most often; and a window of concurrently displayed windows associated with the concurrent multimedia applications that occupies a greatest area of a display; and
adjusting the established priorities among the data flows for the concurrent multimedia applications based upon weights associated with application priorities for one or more of the concurrent multimedia applications.

31. The non-transitory processor-readable medium of claim 25, wherein the multimedia parameter further includes a level of detail (LoD) associated with the data flow.

32. The non-transitory processor-readable medium of claim 25, wherein the stored processor executable instructions are configured to cause a processor to perform operations such that the concurrent multimedia applications include at least a teleconferencing application and a game application.

* * * * *